US011121863B1

(12) United States Patent
O'Neill et al.

(10) Patent No.: US 11,121,863 B1
(45) Date of Patent: Sep. 14, 2021

(54) BROWSER LOGIN SESSIONS VIA NON-EXTRACTABLE ASYMMETRIC KEYS

(71) Applicant: ORACLE INTERNATIONAL CORPORATION, Redwood Shores, CA (US)

(72) Inventors: Kevin Ross O'Neill, Seattle, WA (US); Daniel Music Vogel, Seattle, WA (US); Girish Nagaraja, Sammamish, WA (US); Shobhank Sharma, Kirkland, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/069,561

(22) Filed: Oct. 13, 2020

Related U.S. Application Data

(60) Provisional application No. 62/988,730, filed on Mar. 12, 2020.

(51) Int. Cl.
*H04L 9/08* (2006.01)
*H04L 9/14* (2006.01)
*H04L 9/32* (2006.01)

(52) U.S. Cl.
CPC .......... *H04L 9/0825* (2013.01); *H04L 9/0894* (2013.01); *H04L 9/14* (2013.01); *H04L 9/3213* (2013.01); *H04L 9/3226* (2013.01)

(58) Field of Classification Search
CPC ....... H04L 9/0825; H04L 9/14; H04L 9/3213; H04L 9/0894; H04L 9/3226
See application file for complete search history.

(56) References Cited

U.S. PATENT DOCUMENTS

| 7,325,128 | B2 | 1/2008 | Wood et al. |
| 7,546,630 | B2 | 6/2009 | Tabi |
| 8,146,141 | B1 * | 3/2012 | Grandcolas ........... H04L 9/3226 726/5 |
| 8,250,095 | B2 | 8/2012 | Wu et al. |
| 9,578,015 | B2 | 2/2017 | Xu et al. |
| 9,774,581 | B2 | 9/2017 | Leicher et al. |

(Continued)

FOREIGN PATENT DOCUMENTS

| CN | 105430014 | 3/2016 |
| EP | 3316544 A1 | 5/2018 |

OTHER PUBLICATIONS

International Application No. PCT/US2020/055557, International Search Report and Written Opinion, dated Jan. 18, 2021, 12 pages.

(Continued)

*Primary Examiner* — Henry Tsang
(74) *Attorney, Agent, or Firm* — Kilpatrick Townsend & Stockton LLP

(57) ABSTRACT

Techniques are provided for establishing a session with an application using asymmetric cryptography. Techniques include secure single-sign on capabilities using asymmetric cryptography. With asymmetric signatures, the use of browser local storage and the Web Crypto application programming interface (API), the key cannot be extracted from the browser that it was generated for. The mechanism allows a web domain to track a user login session using a non-extractable asymmetric key stored in the client's web browser, and leverage the non-extractable asymmetric key for single sign-on.

19 Claims, 19 Drawing Sheets

(56) References Cited

U.S. PATENT DOCUMENTS

| | | | |
|---|---|---|---|
| 9,887,965 B2* | 2/2018 | Kay | G06F 21/6245 |
| 2001/0045451 A1* | 11/2001 | Tan | G07F 7/1008 |
| | | | 235/375 |
| 2017/0331802 A1 | 11/2017 | Keshava et al. | |
| 2019/0068377 A1 | 2/2019 | Matsugashita et al. | |
| 2019/0306147 A1* | 10/2019 | Uhr | G06F 16/1824 |
| 2019/0372958 A1* | 12/2019 | Dunjic | H04L 9/0825 |

OTHER PUBLICATIONS

"Generate Keys and Certificates for SSO", Google Workspace Admin Help, Available Online at: https://support.google.com/a/answer/6342198?hl=en, Accessed from Internet on Oct. 19, 2020, 3 pages.

"Keycloak—Overview", Keycloak, Available Online at: https://www.keycloak.org/docs/4.4/securing_apps/, Accessed from Internet on Oct. 19, 2020, 5 pages.

"Partner-operated SAML Single Sign-on (SSO) Service", Google Workshop Admin Help, Available Online at: https://support.google.com/a/answer/6262987, Accessed from Internet on Oct. 19, 2020, 2 pages.

"Single Sign-On with SAP Passports", SAP, Available Online at https://supportsap.com/en/my-support/single-sign-on-passports.html, Accessed from Internet on Oct. 19, 2020, 7 pages.

Locke, "Getting Token Authentication Right in a Stateless Single Page Application", Lightrail, Available Online at: https://medium.com/lightrail/getting-token-authentication-right-in-a-stateless-single-page-application-57d0c6474e3, Jul. 7, 2017, 13 pages.

\* cited by examiner

| # | Key (Key path: "key") | Value |
|---|---|---|
| 0 | "soup-validation" | ▶ {key: "soup-validation", value: {...}}<br>key: "soup-validation"<br>▼ value:<br>  ▶ privateKey: CryptoKey<br>    ▲ algorithm: {name: "RSASSA-PKCS1-v1_5", hash: {...}, modulusLength: 2048, publicExponent: UintBArray (3) }<br>      extractable: false<br>      usages: ["sign"]<br>  ▶ publicKey: CryptoKey<br>    ▲ algorithm: {name: "RSASSA-PKCS1-v1_5", hash: {...}, modulusLength: 2048, publicExponent: UintBArray (3) }<br>      extractable: true<br>      usages: ["verify"] |

*FIG. 16*

BROWSER LOGIN SESSIONS VIA NON-EXTRACTABLE ASYMMETRIC KEYS

CROSS REFERENCE TO RELATED APPLICATIONS

The present application claims priority under 35 U.S.C. § 119(e) to U.S. Provisional Patent Application No. 62/988,730, filed Mar. 12, 2020, entitled "BROWSER LOGIN SESSIONS VIA NON-EXTRACTABLE ASYMMETRIC KEYS," the entire contents of which is incorporated herein by reference for all purposes.

BACKGROUND

Single sign-on (SSO) can be a property of an access management system. With this property, a user can, for example, log into the access management system with a single ID (e.g, user name, email address, etc.) and a password. After a user has logged into the system, the user is allowed to access a website across multiple pages over time without the need to re-authenticate during a single login session. A user does not need to authenticate themselves for each page of a website that is accessed.

However, as single sign-on provides access to many resources once the user is initially authenticated, there could be a negative impact if the credentials are available to other people and/or misused. An industry standard is to use a cookie or other form of bearer token that requires sending the cookie to the server to be validated (either via cryptography or by matching against server-side state). The cookies with tokens are sent to a server, and the server verifies that the user is logged in. However, these tokens can be extracted and potentially stolen, thereby weakening their security profile. Cookies and bearer tokens in general can be used by an attacker if compromised. This leaves cookie-based security vulnerable to man-in-the-middle attacks, session hijacking, and other vulnerabilities.

Example embodiments of the disclosure address these and other problems, individually and collectively.

BRIEF SUMMARY

Example embodiments relate to establishing a session with an application using asymmetric cryptography. Specifically, an example embodiment includes systems and methods that include secure single-sign on capabilities using asymmetric cryptography.

An example embodiment allows for single sign-on using asymmetric cryptography. With asymmetric signatures, through the use of browser local storage and the Web Crypto application programming interface (API), the secret that is used to verify the session state cannot be extracted from the browser that it was generated for.

The mechanism allows a web domain to track a user login session using a non-extractable asymmetric key stored in the client's web browser, and leverage for single sign-on (e.g. using Security Assertion Markup Language (SAML) or OpenID Connect). The non-extractable private keys stored in the client's web browser can be stored using Web Crypto APIs. The server (e.g. access management server) verifies a session state by validating a signed request to the login server rather than accepting a cookie, allowing tracking of login sessions while ruling out man-in-the-middle and session hijacking attacks. Every request can include a digital signature that is validated by the access management server.

An example embodiment provides a non-extractable private key stored in the client's browser. The non-extractable private key can be created using Web Crypto APIs. The client is authenticated with the login server via a one-time signed request rather than by transmitting a cookie or bearer token. This mechanism improves the scalability and security of web login sessions. The single sign-on (SSO) system as disclosed in example embodiments is not vulnerable to many of the attack vectors that traditional login sessions use.

Other embodiments are directed to systems, devices, and computer readable media associated with the methods described herein.

A better understanding of the nature and advantages of exemplary embodiments may be gained with reference to the following detailed description and the accompanying drawings.

BRIEF DESCRIPTION OF THE DRAWING

The disclosure will be readily understood by the following detailed description in conjunction with the accompanying drawings, wherein like reference numerals designate like elements, and in which:

FIG. 16 illustrates key storage in an IndexedDb, in accordance with some example embodiments.

DETAILED DESCRIPTION

Figure 1:
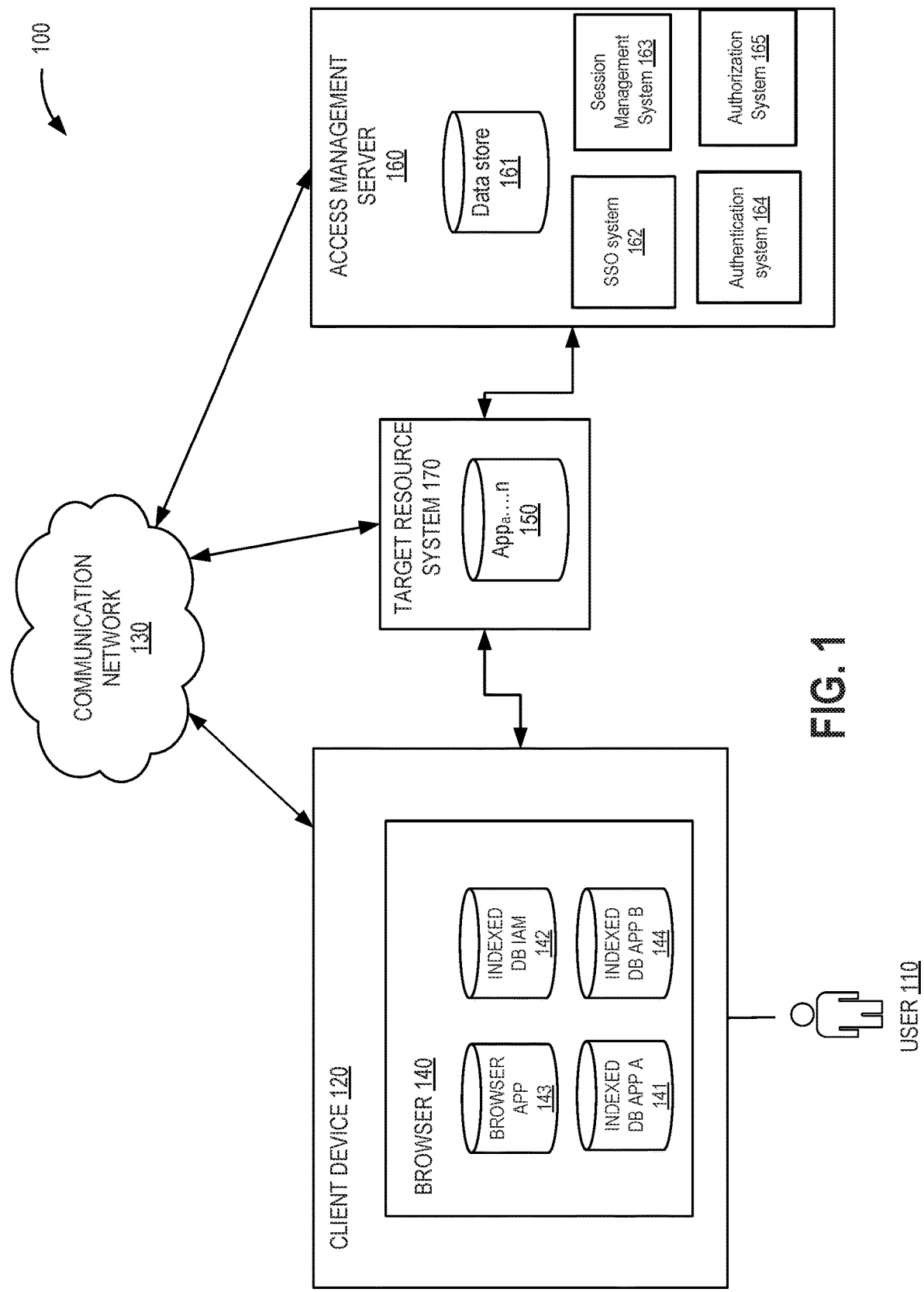
FIG. 1 is a simplified block diagram of a computing environment that includes an identity and access management system, in accordance with some example embodiments.

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

An example embodiment enables single sign-on (SSO) for a user that would like to log on to multiple applications. A user can also be known as a client. For example, a user may log on to multiple applications in an enterprise. When a user attempts to login to a first application, an application on the browser on the user's computer (e.g., browser application), can generate a first public-private key pair [Ab and Av] that includes a first public key [Ab] and a first private key [Av] for the first application.

The browser can be any browser that supports IndexedDB and crypto application programming interfaces (API). IndexedDB is an application programming interface that is provided by web browsers for managing objects. IndexedDB can provide a large amount of data storage compared to, for example, web storage. Further, IndexedDB does not need Structured Query Language (SQL) to retrieve data.

The browser on the user's computer can store the first public-private key pair [Ab and Av] in the browser's storage (e.g., IndexedDB) that is associated with the first application. IndexedDB app can be used for client-side storage of application data. By storing data on the client side, the burden on the server to securely store and maintain data is reduced. IndexedDB IAM can be used for client-side storage of server data. IndexedDB can also be known as IndexedDB or index DB. The first public-private key pair for the first application is stored in the local browser storage that stores information associated with applications.

After the first public-private key pair [Ab and Av] is stored in the browser's IndexedDB, the user's browser is redirected to a login application with the first public key [Ab] being one of the parameters. The login application is associated with a server, such as an access management server. The access management server can also be known as an Identity Access Management (IAM) server or an Oracle Access Management (OAM) server.

The login application generates a second public-private key pair [Sb, Sv] in the user's browser. The user is then prompted via the client device to enter credential information (e.g., user name, email address, password, token, etc.). The user can be prompted to enter their credential information through a form displayed on the client device. After the user enters their credentials, the user can submit the form and the form is submitted to the login application associated with the server. The user can submit the form by selecting, for example, a submit button after entering their credential information.

If the credential information input by the user is correct (e.g., the user has entered their correct username and password), then the user is authenticated and a security token is generated for the user. The security token can be a JSON Web Token (JWT) security token. In the example embodiments, the JWTs are signed JWTs. The JWTs are signed by the server (e.g., IAM server) using a private key that is known only to the server. Therefore, the JWTs disclosed in the example embodiments cannot be manipulated or modified. The security token embeds the second public key [Sb]. Therefore, the security token that is generated for the user with the second public key [Sb] can be identified as SJWT [Sb]. The token that is generated for the server can be known as SJWT. "S" represents that the JWT token is in the domain of the server. The token that is generated for the first application (Application A) can be AJWT. "A" represents that the JWT is in the domain of the first application. The token that is generated for the second application (Application B) can be known as BJWT. "B" represents that the JWT is for the second application.

In the disclosure, first application token refers to the application token that is generated for application A and second application token refers to the application token that is generated for application B. The security token that is generated for the server can also be referred to as server token. Application A and Application B can include any application that uses the access management server.

The security token (SJWT[Sb]) is then stored in the local storage of the browser. The token SJWT[Sb] can now be used to securely communicate with the server application by signing requests made to the server by the non-extractable key Sv (e.g., sign{Sv, {request, SJWT(Sb)}). The security token can be stored in the browser's IndexedDB IAM which is a client side browser storage that stores information associated with the server. Sv and SWJT[Sb] can both be saved in IndexedDB IAM.

The first private key [Av] and the second private key [By] that is stored in the local data store can be used to sign requests and the application JWT (e.g., AJWT, BJWT) with corresponding public key [Ab, Bb] is sent as authorization information.

Since, the security token SJWT[Sb] is an authenticated token, the authenticated token SJWT[Sb] can be used to get an application token for a first application from the server computer by making a signed request to the server (sign{Sv, {request(Ab), SJWT[Sb]}}) to exchange SJWT[Sb] for the application token AJWT[Ab]. The application token for the first application can be represented by, for example AJWT [Ab]. The application token includes the application JWT (AJWT) along with the first public key [Ab]. The server token SJWT[Sb] is exchanged for the application token AJWT[Ab] by making a signed request to the server (sign{Sv, {request(Ab), SJWT[Sb]}}) to exchange SJWT [Sb] for the application token AJWT[Ab]. After the user has obtained the token for the first application, the user is authenticated for the first application. The user can now access the first application.

If the user would like to get authenticated for a second application, the second application will generate a third public-private key pair [Bb and By] for the second application. The third public-private key pair [Bb and By] can be stored in a local store of the browser. For example, the third public-private key pair [Bb and By] can be stored in the browser's IndexedDB app. The third public-private key pair for the second application can be stored in a local browser storage that stores information associated with applications.

After the third public-private key pair [Bb and By] is locally stored, the user's browser is redirected to the login application. The login application will return a JavaScript to the user's browser. The JavaScript indicates a script running on the browser that generates key pairs and accesses IndexedDB, embedded in the page returned by the application when the browser navigates to it. The login application will return the JavaScript because while the user was logging into the first application, the security token SJWT[Sb] was created. The same server JSON Web Token (SJWT) can be used to exchange another application JWT. Therefore, the same JWT that was used to generate the first application token can be used to create an application token BJWT[Bb] for the second application. At this point user is authenticated for the second application. The user can now access the second application.

In an example embodiment, the server maintains a login session using a key pair generated on the client side. The server as described in the specification can refer to a plurality of different types of servers. The authentication server can authenticate originally to begin the login session. The authentication server is then responsible for validating the public key associated with the session. Every request can include a digital signature that is validated by the server.

In order to contact other "data servers" that honor the session, the client can use digital signatures. The data server can defer to the authentication server to validate the signatures for the session. The data server can defer to the authentication server to validate the signatures for the sessions by the data server sending the signature to the authentication server to validate it, the data server asking the authentication server for the public key of the session so it can validate it, the authentication server issuing a token/certificate (e.g. JWT) to the client upon the initial authentication, signing it using a pre-existing key pair whose public key is shared with the data servers. Then when the client makes a session request to a data server, it sends a digital signature using the session private key, and the token from the identity server. The data server then (a) validates the token to determine the public key for the session, and (b) validates the digital signature of the request using the public key from the JWT.

An example embodiment provides a dedicated session to a web console using asymmetric signing instead of, for example, using cookies. A cookie is a small file which is stored on the user's computer and stores data which can be used to access additional applications after an initial login by a user. Cookies can be forged or hacked or obtained by unauthorized users. Therefore, use of cookies for perpetuating a sign-on by a user is not secure.

A cookie includes an identifier and a string of characters that uniquely identifies the session. The browser will send that cookie to every page that is loaded for that website. Therefore, the cookie is verified when a user accesses a different page for the website instead of requiring the user to reenter their credentials every time a different page is accessed.

However, cookies are often sent over an insecure connection. Further, cookies can be subject to phishing attacks or spoofing. For example, someone on a different machine may steal the users account information by spoofing that user. Cookies use a symmetric secret that is known to both sides, and is sent in clear text over a connection to the site being accessed. Therefore, there is a risk of the cookie information being identified by an unauthorized user.

An example embodiment uses asymmetric keys that are signed to let users call into APIs from a browser. Customers are allowed to call representational state transfer (REST) API from JavaScript inside the browser using an asymmetric key that had been signed for specific client sessions. A session includes storage of information that is desired to persist throughout the user's interaction with the web site or web application during the session.

An example embodiment calls REST APIs to represent an authenticated session with a website. Instead of using a symmetric secret, such as that which is done with a cookie, an example embodiment uses an asymmetric key that is stored only in the browser in a secure way. Instead of sending a secret on a wire every time a new webpage is loaded, asymmetric keys are used. A request is signed using a private key. In an example embodiment, the public key is not registered since the public key is embedded inside the JT. However, in alternative embodiments, the public key can be registered with the website that is validating session.

In accordance with an example embodiment, the customer's browser can make API calls and the API calls can be signed asymmetrically. The calls are signed using proof of knowledge of a secret that is stored securely in the browser. The server can validate your session without ever sending a secret that is vulnerable to for example, hacking, phishing spoofing, etc.

An example embodiment provides a novel method of single sign-on in the identity management field. A session is established with a login server that can be used for single sign-on across many sites. A user can log into a plurality of different applications through a single sign-on process. Although single sign-on is described, example embodiments can be used in situations other than single sign-on.

Identity and Access Management System

FIG. 1 is a simplified block diagram of a computing environment that includes an identity and access management system 100, in accordance with some example embodiments.

As shown in FIG. 1, the identity and access management system 100 includes a user 110, a client device 120, a communication network 130, a browser 140, target resource system 170, applications 150, an access management server 160, and a data store 161 of the access management server 160. The data store 161 can store, for example, a public key of a key pair for a session. The applications 150 can be stored on a target resource system 170.

The identity and access management system 100 can also be known as an IAM system. The client can also be known as a client of the identity and access management system 100. The client device 120 may be of various types of devices, including but not limited to, a mobile phone, a tablet, a desktop computer, and the like.

The server can include a Single Sign On (SSO) system 162 and a session management system 163. The browser 140 can also be referred to as a browser application. The server can also include an authentication system 164 that can be used to authenticate a user. A user can be authenticated after the user has entered their credential information. The server can also include an authorization system 165. The authorization system 165 can authorize a user and allow an authenticated user to access applications.

The access management server 160 can be, for example, an identity access management (IAM) server or an Oracle Access Management (OAM) server. Access management server 160 can be a computer, including a processor and a memory. The access management server 160 can be used to perform access management. The access management server can also be known as an authentication server or server throughout this description. The server 160 can store an application that will be used for login. The application that is used for determining whether a user can log into an application can be known as a login application, server application, authentication application, access manager (AM) application, or an identity access management (IAM) application.

The server includes capabilities for providing secure access to protected resources within the computing environment. In certain embodiments, the server includes capabilities for providing Single Sign On (SSO) authentication for users accessing the protected resources. SSO authentication can refer to a session and user authentication service provided by the server that permits a user to use one set of login credentials (e.g., a username and password) to gain access to multiple resources managed and/or protected by the server, without the user having to re-enter login credentials each time to gain access to the individual protected resources. In certain examples, the protected resources may include applications, documents, files, web pages, web content, computing resources in the IAM system.

The identity and access management system 100 may be implemented by one or more computing systems that execute computer-readable instructions (e.g., code, program) to implement the server. As depicted in FIG. 1, server includes various subsystems including a Single Sign On (SSO) system 162 and a session management system 163. Portions of data or information used by or generated by server as part of its processing may be stored in a persistent memory such as data store 161 that is communicatively coupled to server possibly via one or more communication networks. For instance, data store 161 may store information related to SSO sessions established by server for users accessing the protected resources, user credential information related to the users and so on. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The client device 120 can include the browser 140. The browser 140 can be a web browser for accessing information on the Internet. The browser 140 can include storage that is associated with the browser 140. For example, the browser 140 can include a browser application storage 143, an IndexedDB App A 141, and IndexedDB App B 144 and an IndexedDB IAM 142. IndexedDB App A 141 can store information regarding a first application and IndexedDB App B can store information regarding a second application. IndexedDB IAM 142 can store information regarding the access management server. IndexedDB can also be known as IndexedDB. IndexedDB is a JavaScript application programming interface (API) provided by web browsers for managing a database of objects. JavaScript can also be known as JavaScript code in this disclosure. As shown in FIG. 1, browser IndexedDB App A 141, browser IndexedDB App B 144 and a browser IndexedDB IAM 142 are stored locally on a client device of the user. There is a separate IndexedDB for each of the applications and for the server because IndexedDB is domain specific. JavaScript in a first domain will not be able to access resources stored in an IndexedDB of a website for another domain.

In an example embodiment, a user may request access to a protected resource (e.g., a first application) stored on the target resource system 170 using a user interface (UI) (which may be a graphical user interface (GUI)) for an application by entering a uniform resource locator (URL) or other data identifying the requested resource. In certain embodiments, the server is configured to intercept the request from the application, authenticate the user attempting to access the protected resource and upon successful authentication, create a session for the user and provide the user with access to the protected resource. In certain examples, in the same user session (i.e., while still being logged into the first application), a user may attempt to access another protected resource (e.g., second application) stored on target resource system 170. Since the second application is also protected by the server, in certain embodiments, the server determines if the user is authorized to access the second application and if the second application is an SSO-enabled resource. As used herein, an SSO-enabled resource refers to a resource for which SSO processing can be enabled to provide the user access to the resource.

If the user is authorized to access the second application and the second application is an SSO-enabled resource, the server, upon determining that the user session is active and still valid, performs SSO authentication to enable the user access to the protected resource. In some instances, the server may maintain a single SSO session to provide the user access to multiple resources after authentication.

In certain examples, the multiple resources may represent different applications as described above. In other examples, the multiple resources may represent different websites within the same application, different webpages from the same website and so on.

Figure 2:
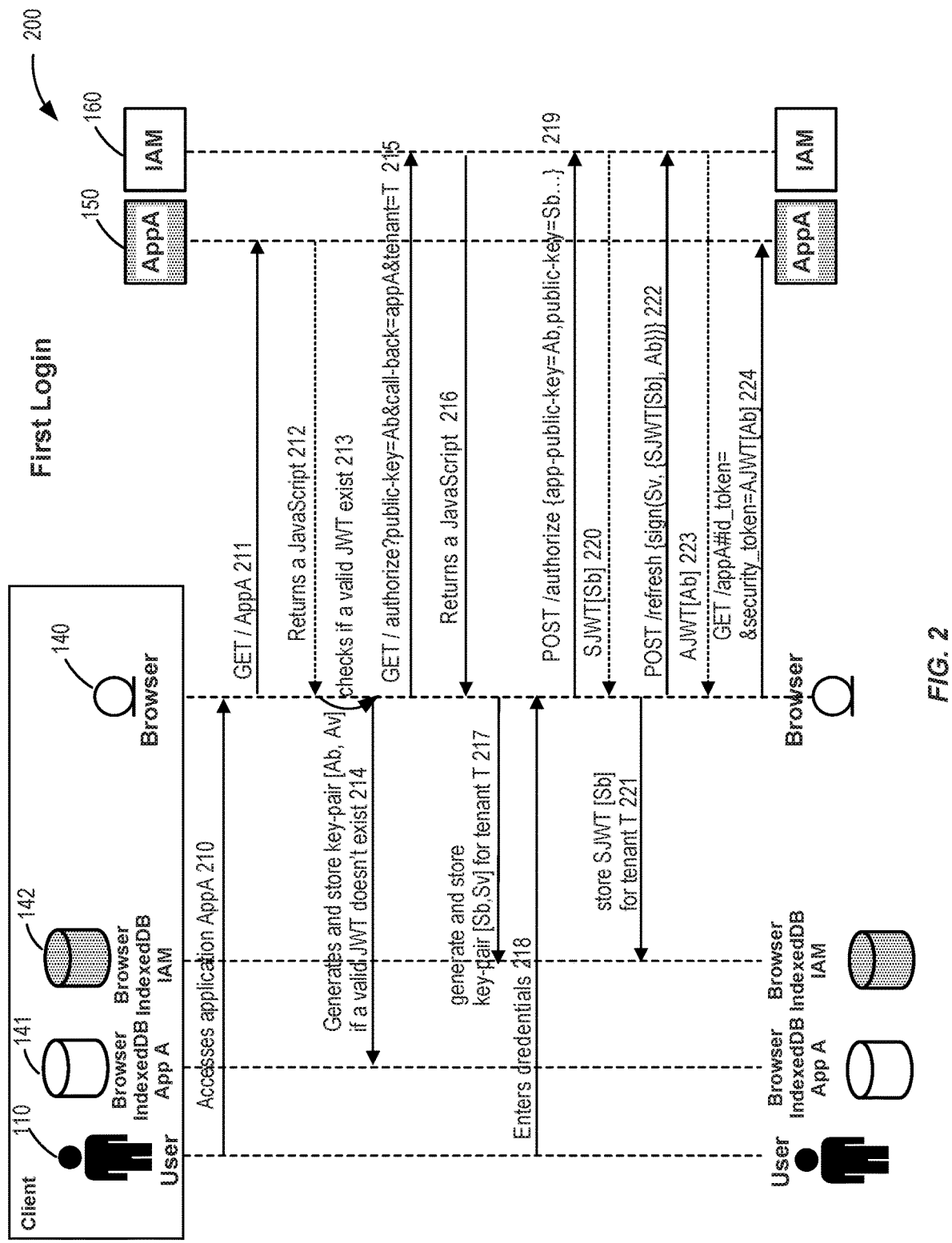
FIG. 2 illustrates a sequence diagram of a method for logging into a first application, in accordance with some example embodiments.

The browser 140 can use a Web Crypto API. Web Crypto API is an interface that can perform cryptographic operations in a web application. Web Crypto API is an interface that can increase the security of web applications by allowing the web applications to perform cryptographic functions.
Method of Logging into First Application—Token Public Key FIG. 2 illustrates a sequence diagram of a method 200 for logging into a first application, in accordance with some example embodiments. In the example shown in FIG. 2, the public key is a token.

As shown in FIG. 2, at step 210, the user 110 may request access to a first application. The first application can also be known as Application A or App A. The uses requests access to the first application using a browser. The steps shown in FIG. 2 can also be known as calls, system calls, requests or web requests between the elements of the identity and access management system 100. As discussed above, the access management server can also be known as an IAM server, OAM server or server. Further, the server can include an application that is used to perform login. The application can be known as a login application, OAM application, IAM application or authentication application. The login application can be a cloud infrastructure login application.

At step 211, the browser 140 on the client device sends a request (e.g., GET request) to the first application 150, in order to obtain access to the first application 150. Specifically, an application, such as a browser application, will send the request. A GET request can be used to request data from a specified source. A GET request uses Hypertext Transfer Protocol (HTTP) to enable communications between clients and servers.

At step 212, the first application 150 returns a JavaScript to browser 140. The JavaScript that is returned can include code that runs as a script embedded in the page returned by the first application, that generates key pairs, and persists the key pairs in the IndexedDB. The JavaScript can check if a valid JWT exists on the browser's IndexedDB At step 213, the browser 140 checks if a valid JSON web token (JWT) exists using the JavaScript from the first application 150. JWT is a signed JWT with the public key embedded in the JWT. The JWT is a document that has the public key from the customer. JWT is a certificate that is in JSON. JWT tokens are a secure method of client authentication. The JWT document is signed by the authentication server. The authentication server can sign the JWT document using any sign-in mechanism for validating the public key. The browser can store the session information. Therefore, the web session can be created without having to store the data on the authentication server.

At step 214, if it is determined that a valid JWT does not exist, the browser 130 generates a first key pair (e.g., [Ab, Av]) and stores the generated first key pair in the browser IndexedDB App A 141. Specifically, an application on the browser generates the first key pair. In the example, Ab represents the public key and Av represents the private key of the first key pair. The private key stays in the browser on the client side, and never leaves the browser. For example, the private key can be stored in IndexedDB App A 141. The private key is not extractable and would only be used to sign through the browser. Further, only the domain for the first application (application A) can access the first key pair Ab and Av.

The public key is available to the public and can be sent to anyone. However, the private key cannot be sent anywhere. The public key can be sent outside of the browser, such as to the server or system that will be validating the passwords. The IAM server that is validating the password can then associate that key for a session.

The private key Av is in domain for the first Application A and the private key By is in domain for second Application B. Application B cannot access private key Av and Application A cannot access private key By. That is, an application cannot access another application's private key if they are in different domains. The token that is used for application A is not the same token that is used for application B since each of the applications are in different domains and therefore have different private keys that cannot be accessed by other applications.

Therefore, there is nothing that can be hijacked. For example, when using cookies, the cookie itself is often sent with the request. In an example embodiment, the private key is not sent with the request. The private key does not leave the browser storage. The browser maintains the key so that it is not extractable. It is stored in a manner that it cannot be read. The browser can sign a request using the private key, however, the browser will not send the private key itself.

For purposes of clarity and ease of understanding, the key pairs are referred to as first, second, and third key pair throughout the description. The first key pair is referred to as [Ab, Av] since it corresponds the first application, Application A. The second key pair is referred to as [Sb, Sv] since it corresponds to a key pair for the server. The third key pair is referred to as [Bb, By] since it corresponds to the second application, Application B. The key pairs are generated by the browser 140.

A non-extractable private key (e.g., Av) is stored in the browser storage and is used to create an unbreakable login session. The private key itself is not sent outside of the browser storage. In addition, the private key that is stored on the client side it is not extractable. The browser sandbox provides a guaranteed mechanism for preventing the extraction of the private key. The private key is stored in a way that it cannot be read. The browser uses the private key to sign, for example, a digital signature or a call to the access management server.

This creates an unbreakable login session that cannot be fished or stolen, and cannot be used to attack the user. Since the private key cannot be extracted out of the browser of the client. Therefore, a signature can be requested that uses the private key, but the private key itself cannot be obtained or extracted. The signature for the private key can be obtained using a module in JavaScript called Web Crypto API.

The public key can be stored on the access management server or the public key can be stored on the client side. If the public key is stored on the server, the server stores the public key locally. For example, the public key can be stored on a data store or database of the server. The public key is associated with a session for the user. When the public key information is desired, it can be identified and looked up in the data store of the server.

Alternatively, the public key can be stored on the client side. For example, the public key can be stored on a storage associated with the browser.

FIG. 16 illustrates key storage in an IndexedDb, in accordance with some example embodiments. As shown in FIG. 16, keys are stored in an IndexedDb. FIG. 16 is an example of key stored in an IndexedDb of application A.

At step 215, the browser sends a request (e.g., GET request), including the first public key (e.g., Ab) of the first key pair to the server 160. The request is to authorize the public key.

At step 216, a JavaScript is returned back to the browser. The server associates the public key from the browser with a session. The session information can be stored in data store 161 of server 160 as shown in FIG. 1. The server 160 can then notify the browser 140 that the user is authenticated.

At step 217, the browser 140 generates and stores a second key pair (e.g., [Sb, Sv]) for the server. The second key pair is stored in the browser IndexedDB IAM 142. The second key pair is in the domain of the login application or server application. The second public key Sb and the second private key Sv can also be referred to as the server private key and the server public key.

At step 218, the user enters their credentials via the browser 140. For example, the user enter their user name and password for the first application. If the user enters correct credential information, the user can be authenticated.

At step 219, the browser 140 sends a request to the server 160 to authorize the user 110 to login to the first application. A successful authentication (e.g., credential information is correct) is passed to the server 160. The browser 140 sends the credential information (e.g., username and password) along with the public key to the server 160. The information can be sent to the server 160 using a POST method. POST can be used to send data to the server to create and/or update information in the server. The data sent to the server with POST is stored in the request body of the HTTP request.

The server receives the username and password and checks that the information is correct. The session information includes session information such as an expiration period (e.g., such as 12 hours or a day) for the session.

At this point, the browser has created a public-private key pair and has sent the public key to the identity management application with login credentials so that login application can authenticate the session. The login application will check if it is a valid session. The login application associated with the server takes the digital signature and the public key and validates the digital signature. The login application will also check that the time stamp of the signed material is correct. Upon successful validation of the digital signature, the server will authenticate the call.

At step 220, the login application is going to create a JWT signed by its own private key (Sv). This JWT is created for maintaining sessions and contains Sv, Sb inside it. Server 160 sends the signed JWT including the public key Sb (SJWT[Sb]) to the browser 140. Therefore, the JWT contains Sb and the JWT including the Sb gets sent back to the browser. SJWT[Sb], which is the first JWT that is created in FIG. 2, is created for maintaining the session with the server.

At step 221, the browser is going to store the signed JWT including the public key Sb. The signed JWT including the public key Sb (SJWT[Sb]) can be stored in the browser IndexedDB IAM 142.

Figure 17:
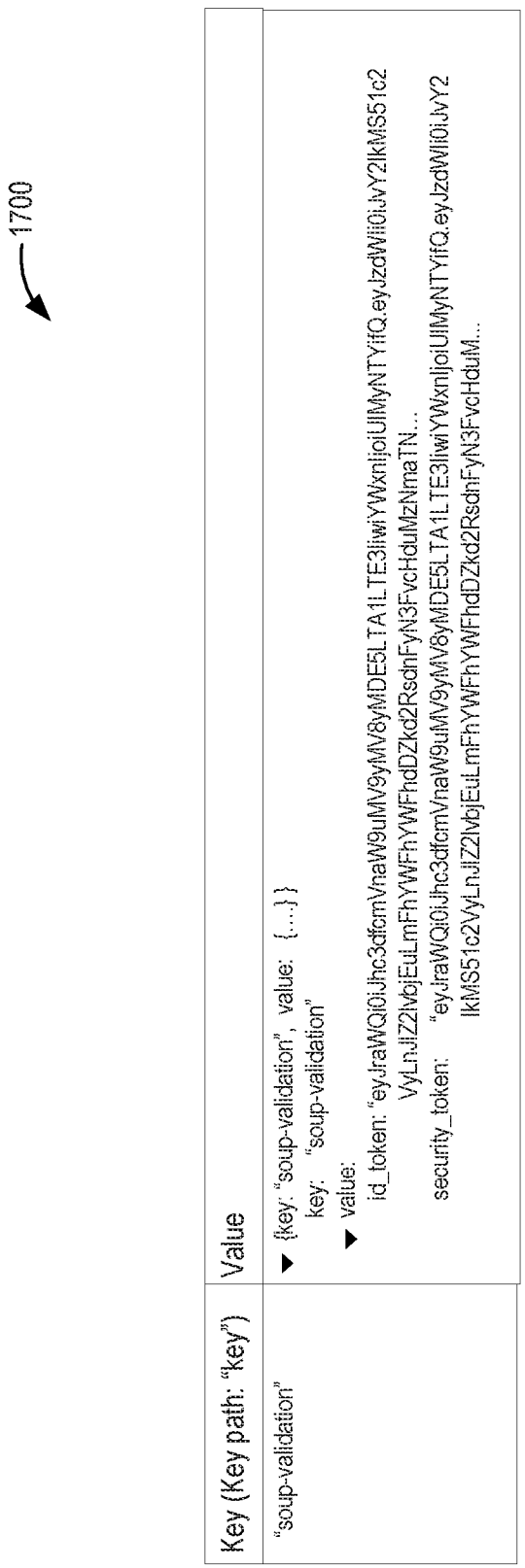
FIG. 17 illustrates JWT storage in an IndexedDb, in accordance with some example embodiments.

FIG. 17 illustrates JWT stored in an IndexedDb, in accordance with some example embodiments. As shown in FIG. 17, keys are stored in an IndexedDb. FIG. 17 is an example of a JWT stored in an IndexedDb IAM.

At step 222, the browser is going to use the private key Sv of the server to sign a request along with the public key of the first application (Ab) and sends this request to the login application. This refresh call is performed in order to obtain a JSON Web Token (JWT) that contains Ab inside it. Therefore, another JWT is obtained containing Ab.

The request to access the first application is validated by using the public key. The public key is used to validate the digital signature. The signature is generated on the client device using the private key. The browser can use this private key to sign any content that is going to be sent to the login application.

At step 223, the server 160 sends AJWT[Ab] to the browser 140. At this point, AJWT is returned back to the browser, as the user is successfully logged into Application A. The SJWT[Sb] is sent in step 222 is exchange for AJWT[Ab] in a secure exchange.

At step 224, the browser is able to access the first application using the signed security token for the first application. The browser makes a call to application A using the signed JWT. The request is signed by the private key of application A. The browser sends the JWT corresponding to the application A private key that was signed by the server. Since JWT was signed by the private key of server (e.g., IAM server), this JWT can be validated by server. Therefore, the first application can ask the server if the JWT can be trusted or not If the server authorizes the signed request, the user is now logged in. After successful login, the first application will store the public key associated with the session.

The application trusts that the public key it is using to validate the request was the one associated with the original authentication session. This can be done by putting the public key in a certificate signed by the server that it knows it can trust. In the example described above, the public key is placed in a certificate signed by the server. However, an alternative embodiment includes storing the public key is a server of the database, which is described in greater detail below with respect to FIGS. 18 and 19.

In the example described the login application signs the JWT using its own cryptography to give back to the client device. Therefore, the login application does not have to look it up in the database and the public key is sent with the request. The client sends the JWT, with the public key embedded in the JWT, along with every request so that the application does not need to look up the public key in a database. The public key is on the request and the login application knows it can trust the information because the JWT was signed by the server itself. Instead of storing the public key in a database, there is a token that stores the public key in a trusted way such that it is sent back to the browser, and it sends that token every time, so the application does not have to look up the public key in a database Therefore, a session is created using asymmetric cryptography. The asymmetric cryptography that is used for creating a session can apply when a user is trying to log on to one application or to multiple applications. Further, example embodiments are described with respect to a single sign-on session, however, the asymmetric cryptography can be applied situations other than a single sign-on session.

In a single sign-on situation, the user does not need to enter their credentials for every application they access. A user can log into a second application without having to enter their credentials.

In another example embodiment for storing the first key pair information, the public key can be stored on the browser side instead of on the authentication server side. Therefore, instead of requiring the authentication server to perform validation for a second session, the browser can validate the second session using a signature validation mechanism or decryption mechanism that can be used locally at the browser based on the information from the first session. Therefore, millions of sessions can be stored without having to look up the key information in a database of the server. That is, an example embodiment allows for the tracking of login sessions without any server-side state while ruling out man-in-the-middle and session hijacking attacks.

Figure 3:
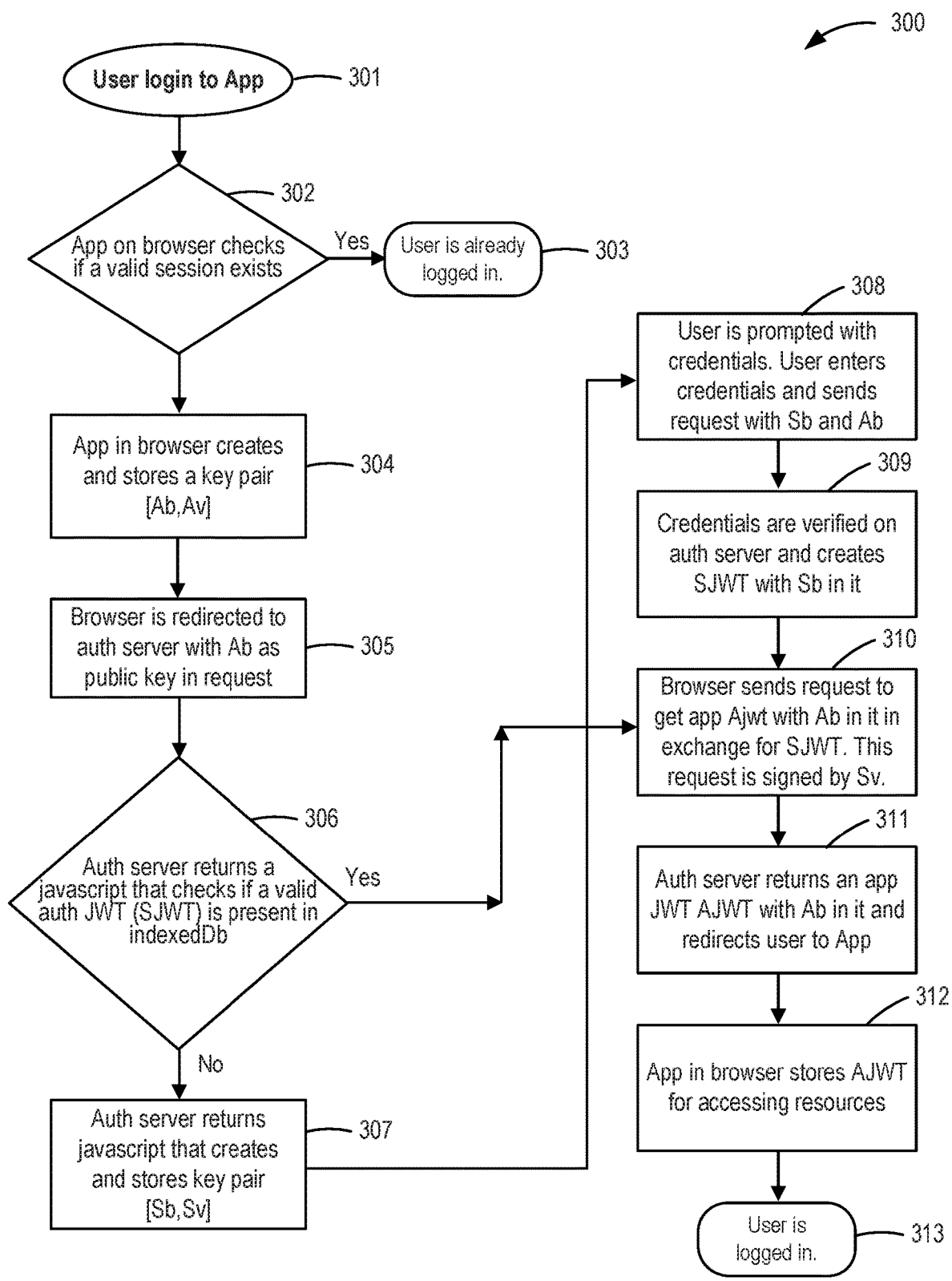
FIG. 3 illustrates a flowchart of a method for logging into a first application, in accordance with another example embodiment.

FIG. 3 illustrates a flowchart of a method 300 for logging into a first application, in accordance with another example embodiment.

As shown in FIG. 3, at step 301 a user would like to log into a first application (e.g., App A). At step 302, the application on the browser checks if a valid session exists. If a valid session exists, at step 303, a user interface for the browser can indicate that the user is already logged in to the application.

At step 304, if a valid session does not exist, the application in the browser can create and store a first key pair. For example the first key pair can be [Ab, Av]. Ab represents a public key and Av represents a private key for the session.

At step 305, the browser is redirected to the authentication server with Ab as the public key in the request.

At step 306, the authentication server returns a JavaScript that checks if a valid authentication JWT is present in the IndexedDB. A valid authenticated JWT can be indicated as SJWT.

If at step 306 it is determined that there is a valid authentication JWT in the IndexedDB, then the method proceeds to step 310.

At step 310 the browser sends a request to get Application AJWT with Ab in it in exchange for SJWT. This request is signed by Sv.

At step 311, the authentication server returns an application JWT (AJWT) with Ab in it. That is, the authentication server returns AJWT[Ab] and redirects the user to the first application.

At step 312, the application in the browser stores AJWT for accessing resources.

At step 313, the user is now logged in.

If at step 306 it is determined that there is not a valid authentication JWT, then at step 307 the authentication server returns a JavaScript that creates and stores a second key pair (e.g., [Sb, Sv]).

At step 308, a user is prompted to enter their credential information. The user enters their credentials and sends a request with the second public key (Sb) and the first public key (Ab).

At step 309, the authentication server verifies the credentials and creates SJWT with the second public key (Sb) in it.

The method then proceeds to steps 310, 311, 312 and 313, as described above.

After a user has logged into a first application, a user can log into a second application, that is in a different domain from the first application, without having to re-enter their credential information Method of Logging into Second Application—Token Public Key Since the second application (Application B) and the first application (Application A) are in different domains, authorization to access the application needs to be performed for each application. That is, authorization is needed to access Application B and a separate authorization is needed to access Application A.

The token that was being used for Application A cannot be used for Application B, because the private key that is needed for Application B is in the domain of Application B, and the initial token only contains a public key of Application A. The scripts that are making calls to Application B cannot access the private key that is stored in the domain of Application A, even though they are on the client side.

In the past, if a session with a second application is to be established, the user directly establishes a session with the second application. In an example embodiment, single-sign on is used to allow the user to access the second application, without requiring the user to perform a second authorization with the second application. An example embodiment uses the second key pair (Sb, Sv) with SJWT[Sb] to generate different tokens for Application A and Application B to thereby support single sign-on.

Since Application A and Application B are on different domains, different tokens will be needed to access each application. One token that contains a public key for Application A's session and another token that contains the public key for Application B's session. However, since an example embodiment allows for single sign-on, the second token can be obtained without challenging the user again for credentials. The user does not need to re-enter their credential information.

The server token SJWT that is in the server's domain is used to access both applications. After authentication is done, and there is a token (SJWT) for the domain of the server, a request can be made to get other tokens for other the applications in other domains. Although a second application is described, the method can be performed for a third application, a fourth application and so on.

In order to log into the second application, the browser 140 is going to use the second private key (Sv) that was generated in step 217 of FIG. 2. The browser will sign materials associated with the request to access the second application 155. For example, the request may include a current timestamp or username. An asymmetric digital signature is created using the private key. The server private key is unextractable and was created along with the initial authentication request when accessing the first application. The browser uses the private key from storage located in the browser in order to sign requests. That is, the private key is non-extractable, but can be used by the API of the browser to sign a request.

If a session has already been established with the server, then the browser will use the server private key that it already has stored to authenticate the session with the second application. The browser can send a request along with the public key for the second application and the login application will sign the request authorizing access to the second application. The browser can send the signed information to the second application and the second application will authenticate the session and allow access to the second application.

When a request (e.g., web request) is made to the second application, the request is signed using the private key for the second application. The request also includes the AJWT. Av (private key of Application A) will sign the request and an authorization header will have AJWT[Ab]. When authorization is evaluated, the signature created by signing using Av will be validated with Ab. The second application can validate that the token is from the server, extract the public key from it, and use the token to validate the signature that came from the browser. The session with the second application would then be authenticated.

Figure 4:
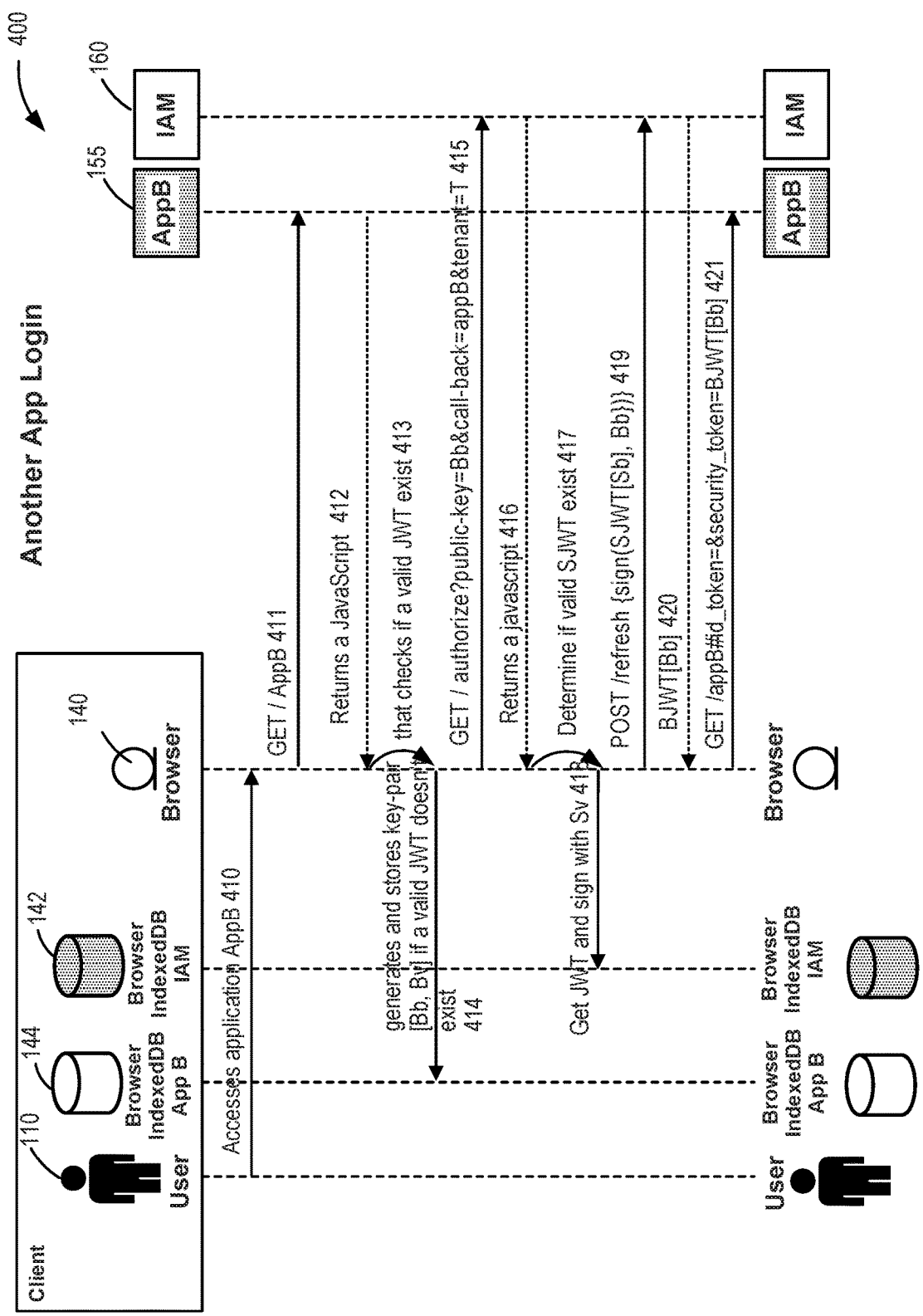
FIG. 4 illustrates a sequence diagram of a method for logging into a second application, in accordance with some example embodiments.

FIG. 4 illustrates a sequence diagram of a method 400 for logging into a second application, in accordance with some example embodiments. The steps shown in FIG. 4 occur after the steps in FIG. 3 are performed and a user has successfully logged into a first application (Application A). The example embodiment of logging a user onto a second application is performed after the user has already logged onto the first application. In the example shown in FIG. 4, the public key is a token.

At step 410, the user 110 wants to access a second application 155 (e.g. App B). At this point in time the user has already logged into the first application (App A) and a private key for the first session was created and stored in storage for the browser 140. For example, the private key can be stored in the storage IndexedDB IAM 142. That is, the sequence shown in FIG. 2, has been performed prior to performing the sequence shown in FIG. 4, and the user is logged into the first application. The user would now like to access a second application (e.g., App B) that is different from the first application (e.g., App A).

At step 411, the browser 140 sends a request to the second application 155. The request is to access second application 155. The request can be for example a GET request.

At step 412, the second application (Application B) will send a JavaScript back to browser. The second application 155 can return a JavaScript that will be used to check if a valid JWT exists.

In an example embodiment, the JavaScript code can be used to authenticate. Therefore, the key is used to sign timely data. For example, the timely data can include, for example, a timestamp and a name representing the user. The data is signed cryptographically such that the resulting signature can be validated using the public key as proof that only someone with the private key certified by the browser could have made that signature. The browser is going to take the signature and send it along with the request for data from the server. The signature can be in an HTTP header to ensure a secure transmission.

At step 413, the JavaScript is used to check if a valid JWT exists. The JavaScript code for the second application 155 will recognize if there is a key pair that has been generated, and if it is available in local storage. The JWTs will have a timestamp to show whether it is valid for a session. At step 413, the browser 140 checks if a valid JWT exists using the JavaScript that the browser 140 received from the second application 155.

At step 414, the browser is going to generate the third public-private key pair (Bb and By) if it was determined at step 413 that a valid JWT for the second application (application B) does not exist. In the third key pair, Bb is the public key and By is the private key. The private key By is not sent to the second application 155 or to the server 160. Instead, the private key remains stored locally at the browser 140, such as in browser IndexedDB App B 144. The private key By is used to sign requests.

At step 415, the public key Bb is sent to the server application. The browser 140 sends a request to authentication server 160 which includes the public key for authorizing access to the second application 155. The request can be a GET request. The request that is sent to the second application 155 includes the public key (Bb) that was generated by the browser at step 414.

At step 416, the server application will send back another JavaScript to check if a valid SJWT exists.

At step 417, the JavaScript is used to determine whether there is a valid server token (SJWT). It is determined whether a valid authentication server JWT (SJWT) exists.

At step 418, if it is determined that there is a valid server token SJWT, then the browser can determine that they are in the domain of the login application. If a valid authentication server JWT exists, at step 418 the JWT is obtained and signed with the second private key (Sv) that was generated in step 217 of FIG. 2.

At step 419, since it was determined that there exists a valid SJWT, the browser sends the SJWT with Bb to the server application. The browser 140 sends the signed JWT, including the second public key (Sb) and third public key (Bb). A request with request-body containing SJWT[Sb] and Bb is signed using Sv and is sent to IAM server. This can be represented as sign(Sv,{SJWT[Sb],Bb}).

At step 420, the server creates a new JWT with the public key [Bb] embedded in the JWT. The browser receives a token for application B in exchange for the SJWT. The browser receives a token BJWT[Bb] in exchange for the SJWT. Application B trusts the JWT signed by the server. At this point, there is a BJWT which contains Bb and this is going to be sent back to the browser.

At step 421, the browser makes a call to application B using the application B private key. The browser sends the JWT corresponding to the application B private key that was signed by the server. Application B will check with the server, in order to determine the authenticity of this token, since the server signed the token using the server's own private key. The user is logged in to Application B without requiring any kind of credential authentication and can access application B.

As disclosed in the example embodiments, the public key is associated with the login session, and the digital signature, that includes the private key, is validated using the public key. The server will check, for example, time stamp information of the signed material to make sure that the material was signed recently. Upon a successful validation of that digital signature, the call is authenticated.

In both example embodiments of logging into a first application and logging into a second application, the private key of the first key pair is stored only on the browser side.

The token for Application A's session includes the public key for Application A. The token for Application B's session includes the public key for Application B. Separate tokens are generated for each application since the private key that is used for Application B is in the domain of Application B and the private key that is used for Application A is in the domain of Application A. The scripts that are making calls to application B cannot access the private key of application A. The scripts that are making calls to application A cannot access the private key of application B. Therefore, each application has their own public token in order to obtain the private token.

User Interface

Figure 5:
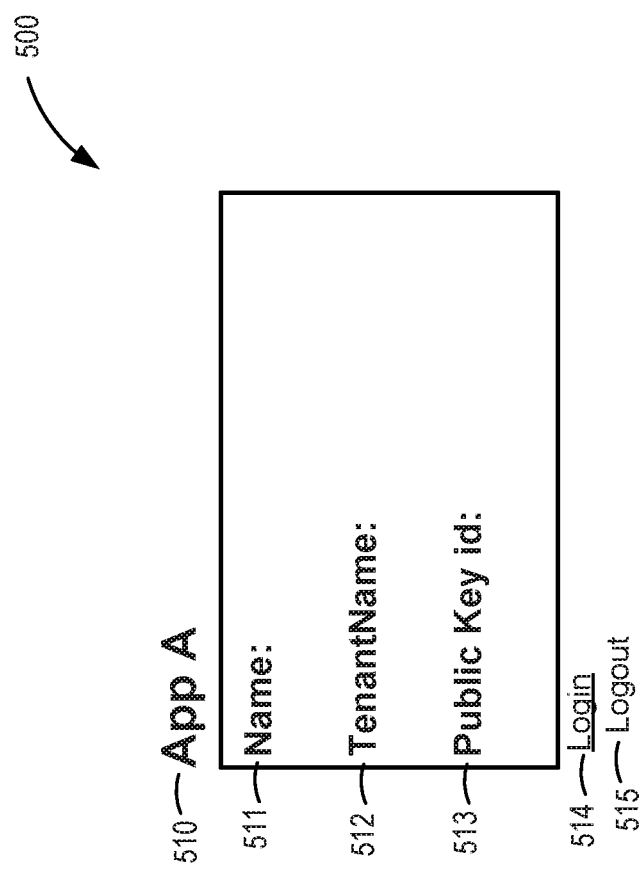
FIG. 5 illustrates a user interface displaying information for accessing a first application, in accordance with some example embodiments.

FIG. 5 illustrates a user interface 500 displaying information for accessing a first application, in accordance with some example embodiments.

As shown in FIG. 5, currently the Name 511, TenantName 512 and Public Key ID 513 information is blank. When the user selects the login button 514, the user will be directed to the interface shown in FIG. 6.

Figure 6:
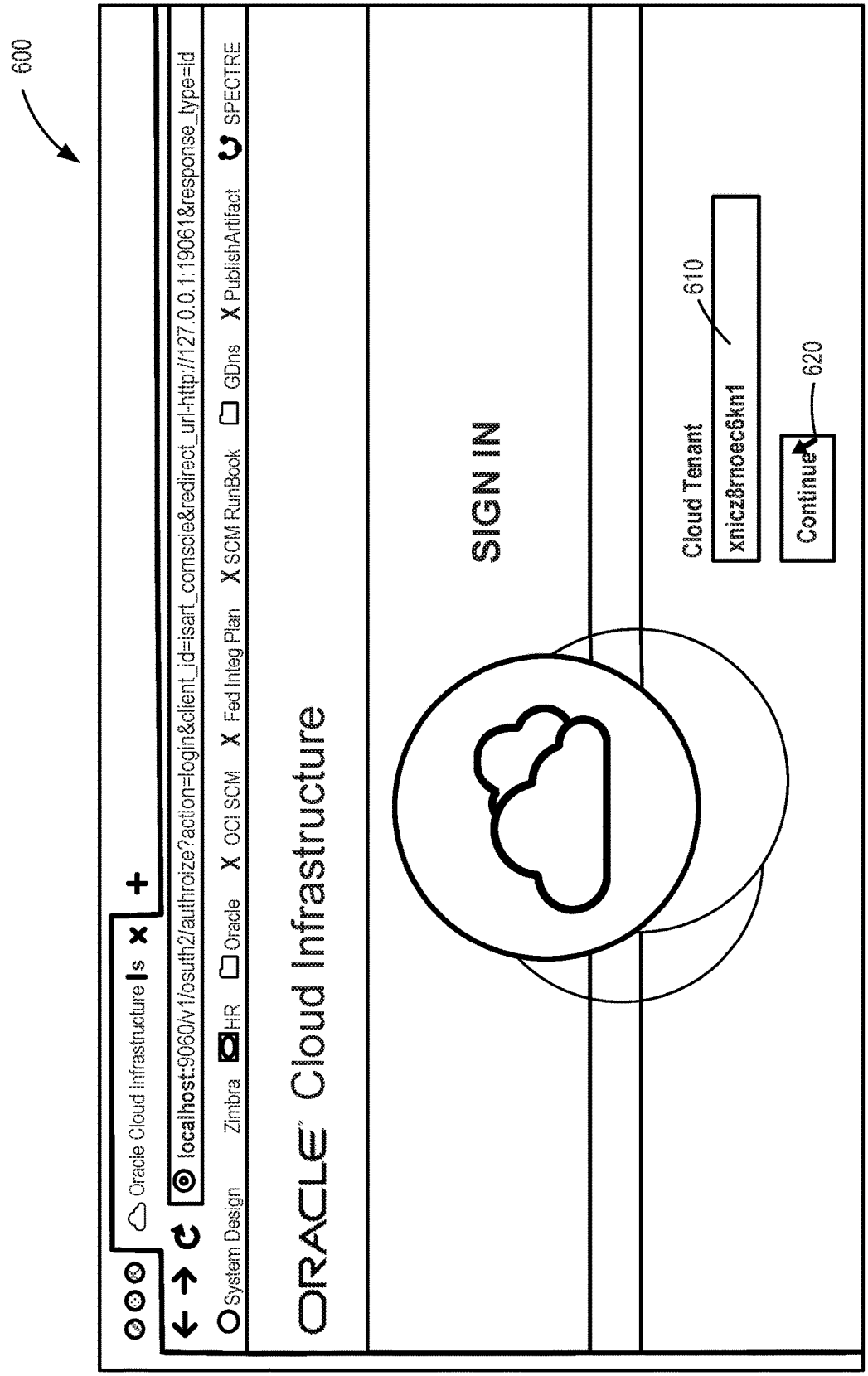
FIG. 6 illustrates a user interface for entering cloud tenant information, in accordance with some example embodiments.

FIG. 6 illustrates a user interface 600 for a entering cloud tenant information, in accordance with some example embodiments. The user interface shown in FIG. 6 can correspond to the application that is located on the browser.

An example embodiment is directed to a cloud computing system. Therefore, there can be multiple tenants in the cloud computing environment. Therefore, as shown in FIG. 6, the customer enters their tenant information in order to sign into the cloud computing environment. The computing system can be a cloud infrastructure system including a multitenant environment. A multitenant environment can include an environment in which a server serves multiple tenants or customers.

As shown in user interface 600, a user has provided the tenant information and the user is prompted to sign in to the cloud computing environment After entering the tenant information, the user can select the continue button 620. The tenant is then signed into cloud computing environment as shown in FIG. 7.

Figure 7:
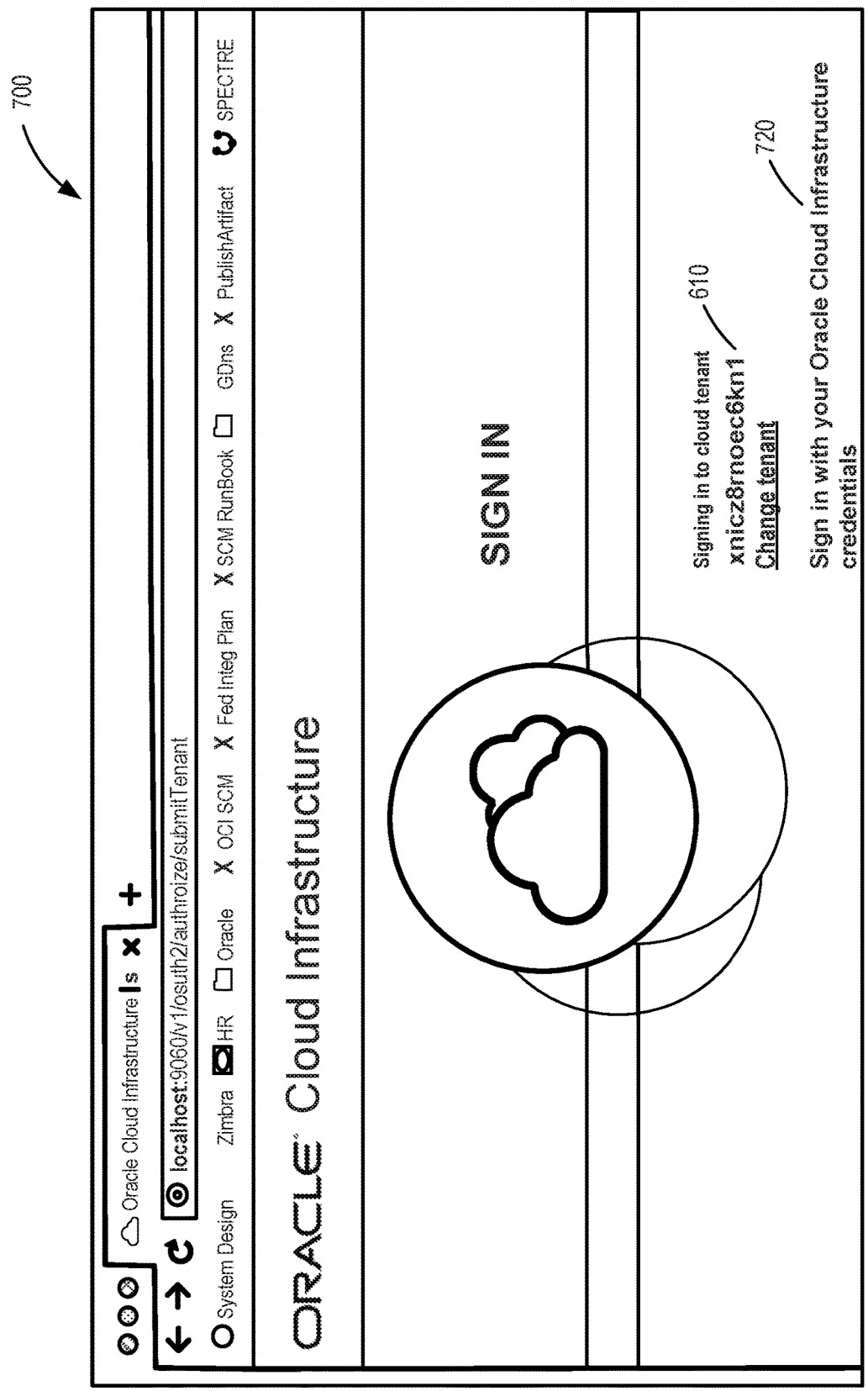
FIG. 7 illustrates a user interface directing the user to sign into a specific infrastructure, in accordance with some example embodiments.

FIG. 7 illustrates a user interface 700 directing the user to sign into a specific infrastructure, in accordance with some example embodiments.

The user can select to sign in with their credentials by selecting the link 720 to sign in with their credentials.

Figure 8:
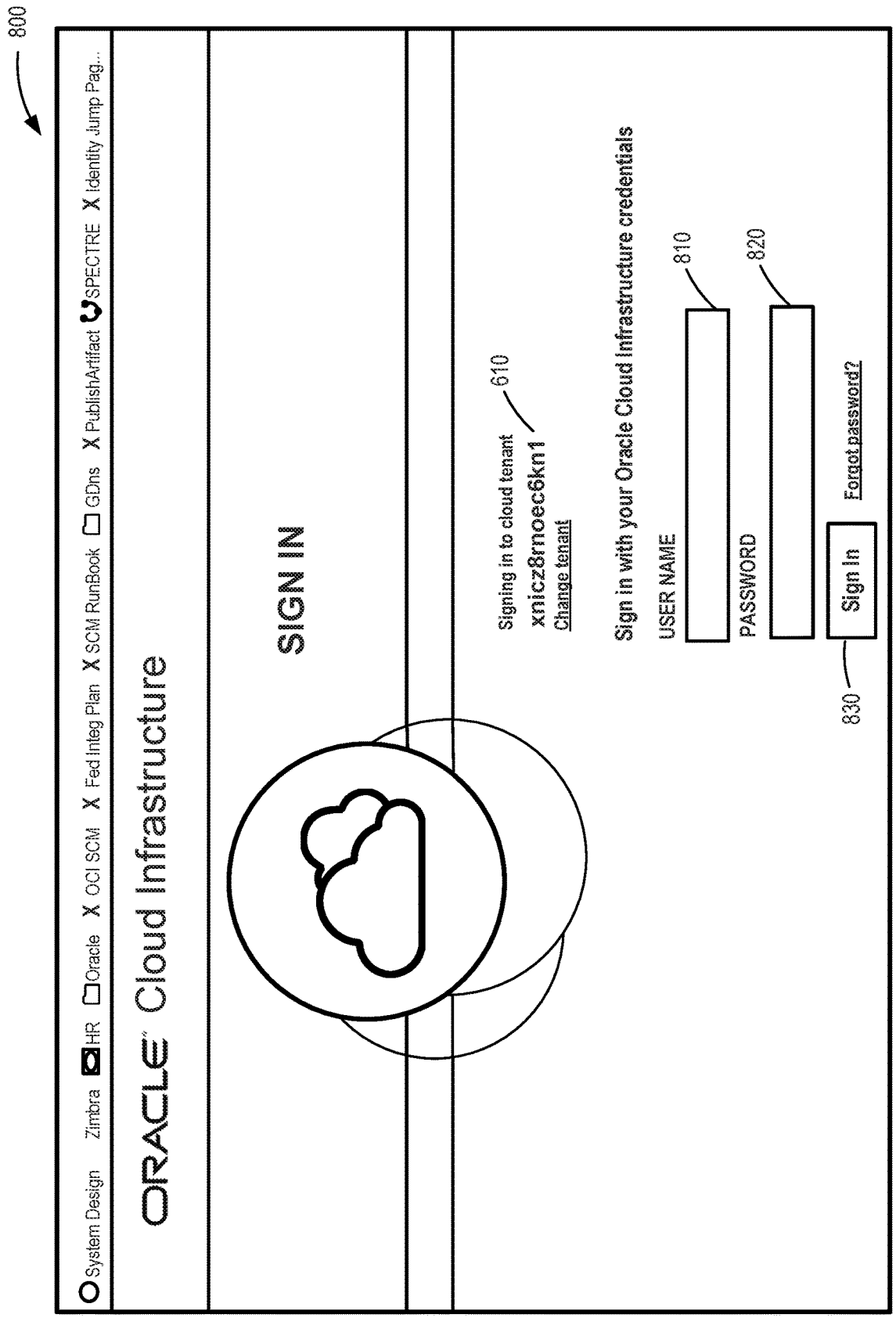
FIG. 8 illustrates a user interface for entering credential information, in accordance with some example embodiments.

FIG. 8 illustrates a user interface 800 for entering credential information, in accordance with some example embodiments.

As shown in FIG. 8, the user is prompted to enter a username 810 and password 820. After the user enters their username and password and selects the sign in the button 830, the server processes the request.

FIG. 8 can correspond to step 218 of FIG. 2, during which the user enters their credential information in order to access a first application. The user enters their credential information such as user name 710 and password 711 and the user signs into the system.

Figure 9:
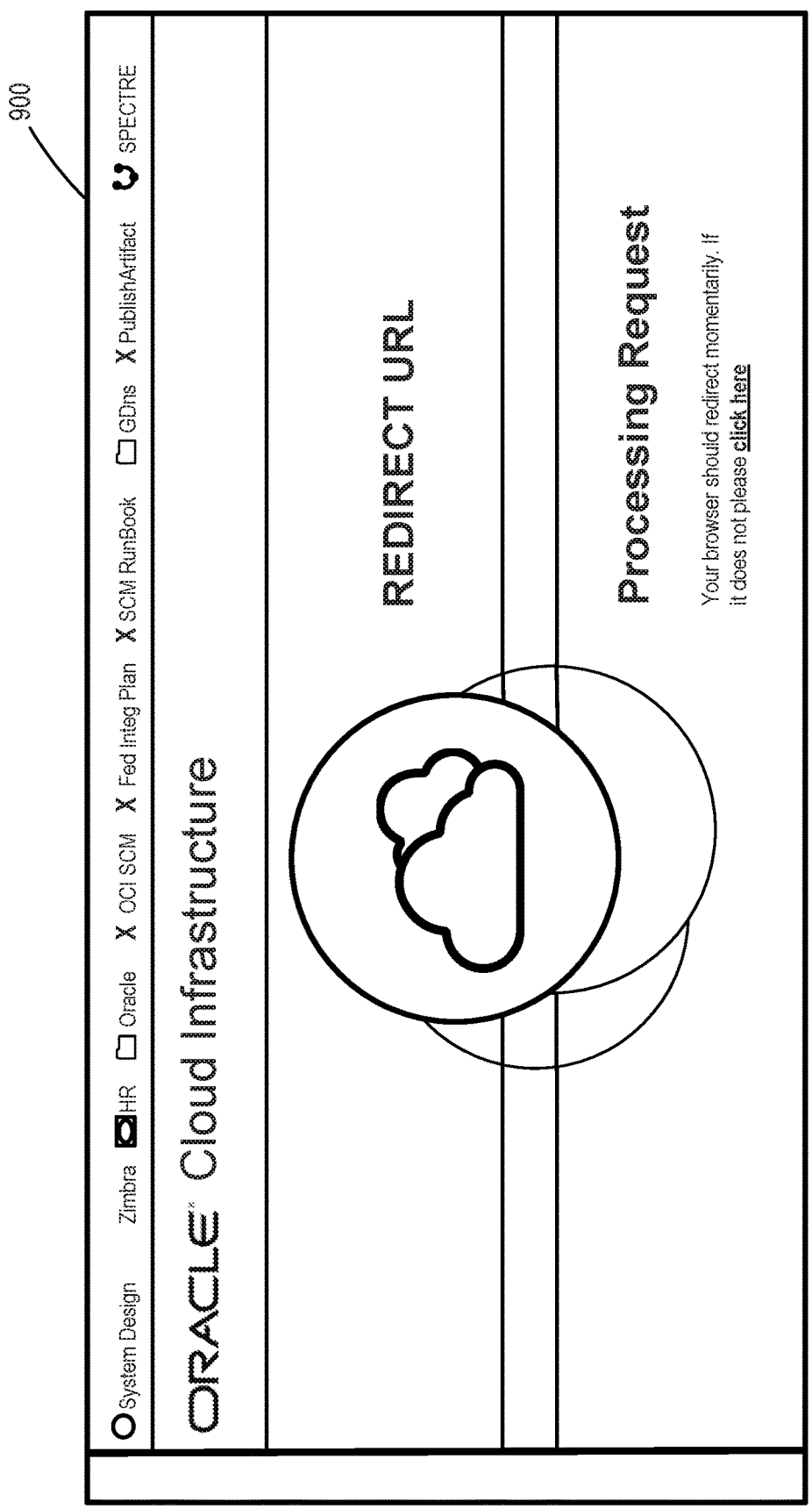
FIG. 9 illustrates a user interface that is displayed when processing a request, in accordance with some example embodiments.

FIG. 9 illustrates a user interface 900 that is displayed when processing a request, in accordance with some example embodiments.

Figure 10:
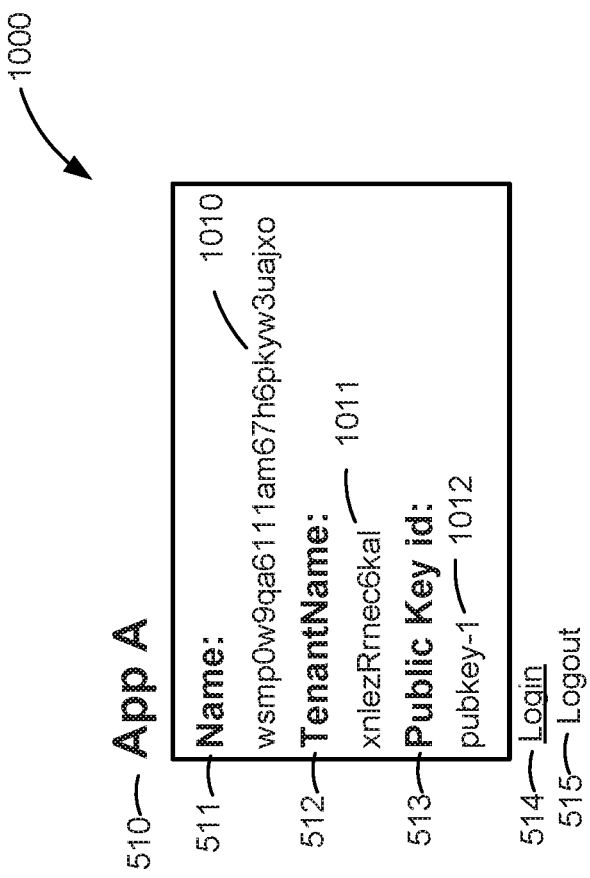
FIG. 10 illustrates a user interface displaying completed information for accessing a first application, in accordance with some example embodiments.

FIG. 10 illustrates a user interface 1000 displaying completed information for accessing a first application, in accordance with some example embodiments. After the user has entered their credential information in FIG. 8 and the request has been processed as shown in FIG. 9, the user is directed to the page for the first application. As shown in FIG. 10, the name, TenantName and PublicKey ID information has now been completed. After the request is processed, as shown in FIG. 9, a user interface displaying the completed information for accessing the first application is displayed on the user interface.

When a user desires to access a second application, a user interface is displayed for logging into the second application.

Figure 11:
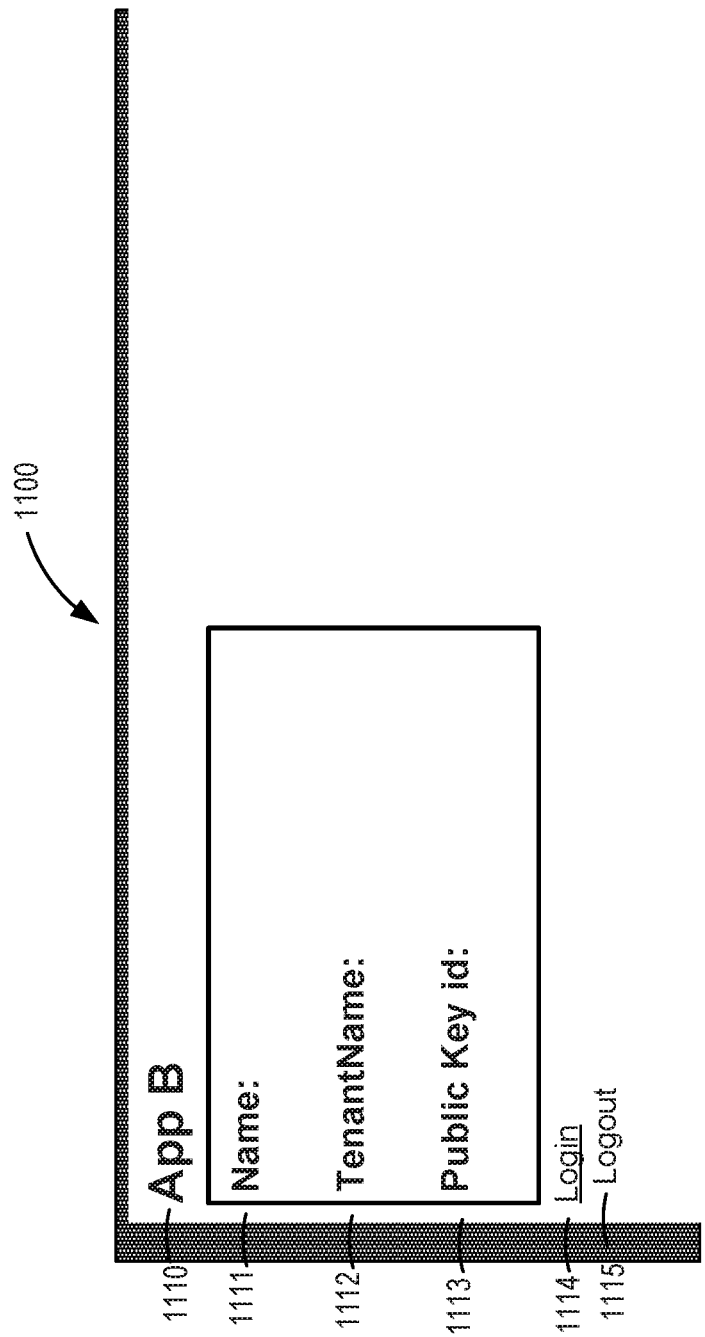
FIG. 11 illustrates a user interface displaying information for accessing a second application, in accordance with some example embodiments.

FIG. 11 illustrates a user interface displaying information for accessing a second application, in accordance with some example embodiments.

As shown in FIG. 11, the information for accessing the second application is incomplete. In the past, in order for a user to access the second application, the user would perform a separate authorization process for the second application. That is, the user would perform steps similar to that which is shown in FIGS. 6-9, but for the second application. However, instead of requiring the user to reenter credential information, when the user selects login button 1114, the information for accessing the second application is automatically populated.

The user does not have to reenter credential information. The information that was generated when obtaining authorization to access the first application is used to access the second application. Specifically, SJWT[Sb] is used to get BJWT[Bb].

Figure 12:
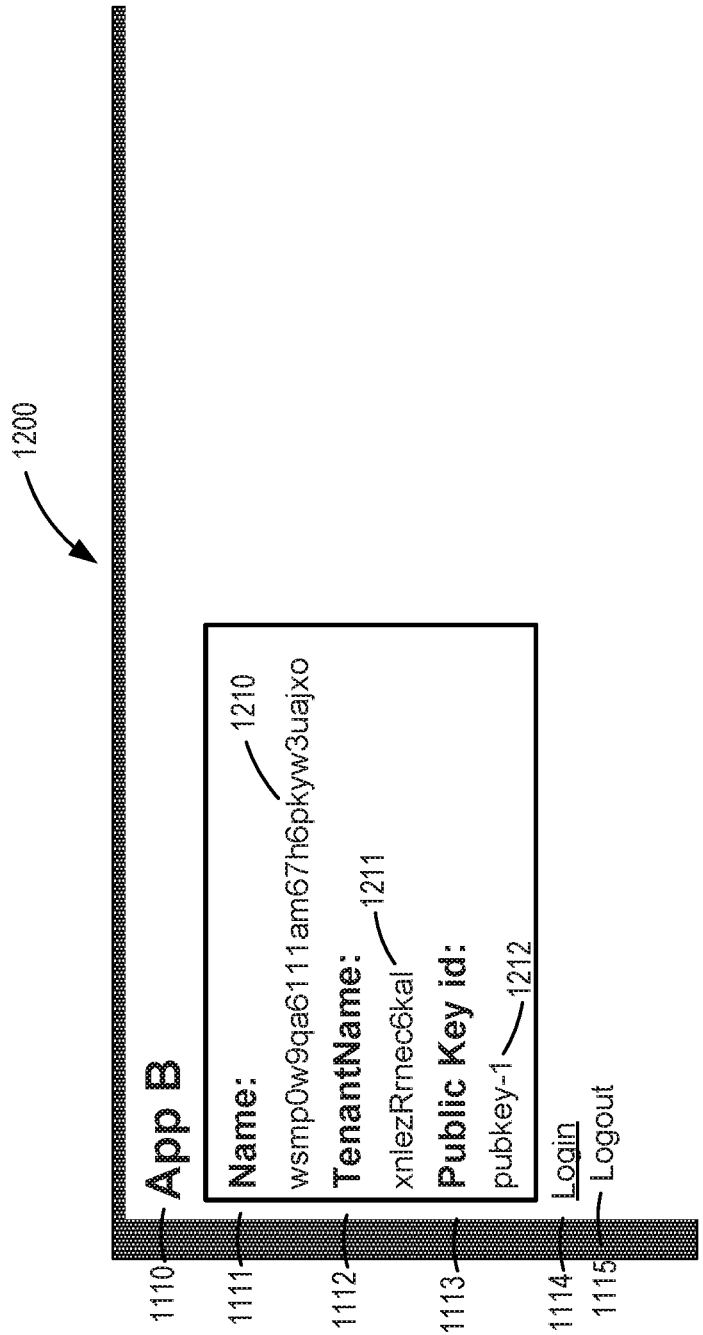
FIG. 12 illustrates a user interface displaying completed information for accessing a second application, in accordance with some example embodiments.

FIG. 12 illustrates a user interface displaying completed information for accessing a second application, in accordance with some example embodiments. As shown in FIG. 12, the information for accessing the second application is completed. When the user selects the login button 1114 in FIG. 11, the user does not have to enter additional information and the system automatically directed the user to the interface shown in FIG. 12.

Although login for two applications are described, the token SJWT and can be used to authenticate the user for a plurality of applications. For example, a user can login to three or four applications without having to enter their credential information. Instead of requiring reentry of credential information the SJWT is used.

Method of Logging into First Application—Server Database

Figure 18:
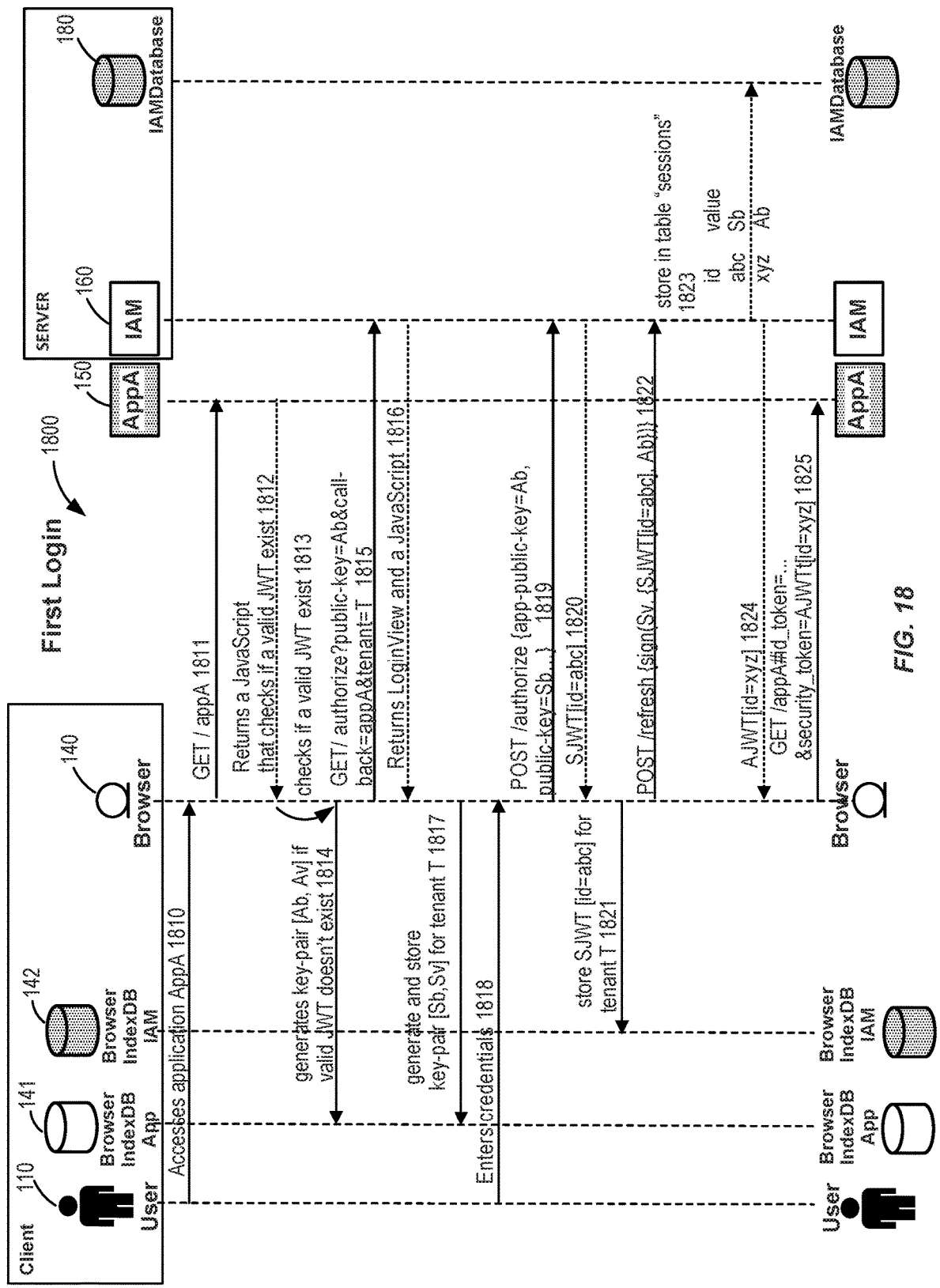
FIG. 18 illustrates a sequence diagram of a method for logging into a first application using a server database, in accordance with some example embodiments.

FIG. 18 illustrates a sequence diagram of a method for logging into a first application using a server database, in accordance with some example embodiments. In the example shown in FIG. 18, the public key is not a token and the public key is maintained on a database for the server. Since the public key is stored in a database, the public key can be looked up in the database.

FIG. 18 includes elements similar to FIG. 2, however, FIG. 18 includes a server database 180 (e.g., IAM database). The server database can be configured to store public keys.

As shown in FIG. 18, at step 1810, the user 110 may request access to a first application. The first application can also be known as Application A or App A. The steps shown in FIG. 18 can also be known as calls, system calls, requests or web requests between the elements of the identity and access management system 100. As discussed above, the access management server can also be known as an IAM server, OAM server or server. Further, the server can include an application that is used to perform login. The application can be known as a login application, OAM application, IAM application or authentication application. The login application can be a cloud infrastructure login application.

At step 1811, the browser 140 on the client device sends a request (e.g., GET request) to the first application 150, in order to obtain access to the first application 150. Specifically, an application, such as a browser application, will send the request. A GET request can be used to request data from a specified source. A GET request uses Hypertext Transfer Protocol (HTTP) to enable communications between clients and servers.

At step 1812, the first application 150 returns a JavaScript to browser 140 that checks if a valid JWT exists. The JavaScript that is returned can include code that runs as a script embedded in the page returned by the first application, that generates key pairs, and persists the key pairs in the IndexedDB.

At step 1813, the browser 140 checks if a valid JSON web token (JWT) exists using the JavaScript from the first application 150. JWT is a signed JWT with the public key embedded in the JWT. The JWT is a document that has the public key from the customer. JWT is a certificate that is in JSON. JWT tokens are a secure method of client authentication. The JWT document is signed by the authentication server. The authentication server can sign the JWT document using any sign-in mechanism for validating the public key. The browser can store the session information. Therefore, the web session can be created without having to store the data on the authentication server.

At step 1814, if it is determined that a valid JWT does not exist, the browser 130 generates a first key pair (e.g., [Ab, Av]) and stores the generated first key pair in the browser IndexedDB App A 141.

This is validated by client application by checking if a valid JWT exists. If a valid JWT does not exist, then the JavaScript generates a public-private key pair and stores public-private key pair in browser IndexedDb.

Specifically, an application on the browser generates the first key pair. In the example, Ab represents the public key and Av represents the private key of the first key pair. The private key stays in the browser on the client side, and never leaves the browser. For example, the private key can be stored in IndexedDB App A 141. The private key is not extractable and would only be used to sign through the browser. Further, only the domain for the first application (application A) can access the first key pair Ab and Av.

The public key is available to the public and can be sent to anyone. However, the private key cannot be sent anywhere. The public key can be sent outside of the browser, such as to the server or system that will be validating the passwords. The server that is validating the password can then associate that key for a session.

The private key Av is in domain for the first Application A and the private key By is in domain for second Application B. Application B cannot access private key Av and Application A cannot access private key By. That is, an application cannot access another application's private key if they are in different domains. The token that is used for application A is not the same token that is used for application B since each of the applications are in different domains and therefore have different private keys that cannot be accessed by other applications.

Therefore, there is nothing that can be hijacked. For example, when using cookies, the cookie itself is often sent with the request. In an example embodiment, the private key is not sent with the request. The private key does not leave the browser storage. The browser maintains the key so that it is not extractable. It is stored in a manner that it cannot be read. The browser can sign a request using the private key, however, the browser will not send the private key itself.

For purposes of clarity and ease of understanding, the key pairs are referred to as first, second, and third key pair throughout the description. The first key pair is referred to as [Ab, Av] since it corresponds the first application, Application A. The second key pair is referred to as [Sb, Sv] since it corresponds to a key pair for the server. The third key pair is referred to as [Bb, By] since it corresponds to the second application, Application B. The key pairs are generated by the browser 140.

A non-extractable private key (e.g., Av) is stored in the browser storage and is used to create an unbreakable login session. The private key itself is not sent outside of the browser storage. In addition, the private key that is stored on the client side it is not extractable. The browser sandbox provides a guaranteed mechanism for preventing the extraction of the private key. The private key is stored in a way that it cannot be read. The browser uses the private key to sign, for example, a digital signature or a call to the access management server.

This creates an unbreakable login session that cannot be fished or stolen, and cannot be used to attack the user. Since the private key cannot be extracted out of the browser of the client. Therefore, a signature can be requested that uses the private key, but the private key itself cannot be obtained or extracted. The signature for the private key can be obtained using a module in JavaScript called Web Crypto API.

The public key can be stored on the access management server or the public key can be stored on the client side. In the example shown in FIG. 18, the public key is stored on the database of the access management server. When the public key is stored on the server, the server stores the public key locally. For example, the public key can be stored on a data store or database of the server. The public key is associated with a session for the user. When the public key information is desired, it can be identified and looked up in the data store or database of the server.

At step 1815, the browser sends a request (e.g., GET request), including the first public key (e.g., Ab) of the first key pair to the server 160. The request is to authorize the public key. JavaScript then redirects user's browser to IAM server with the public key [Ab] generated in step 1812, 1813 and 1814.

At step 1816, the server returns a LoginView and a JavaScript. The IAM server responds with a JavaScript that generates a public-private key pair [Sb and Sv]. These keys will be used for maintaining Single Sign On session with IAM. The IAM server can present the user with a login screen via the LoginView control.

At step 1817, the browser 140 generates and stores the second key pair (e.g., [Sb, Sv]) for the server. The second key pair is stored in the browser IndexedDB IAM 142 in the user's browser. The second key pair is in the domain of the login application or server application. The second public key Sb and the second private key Sv can also be referred to as the server private key and the server public key.

At step 1818, the user enters their credentials via the browser 140. For example, the user enter their user name and password for the first application. The user name and password can be entered on the login screen. The form submission also submits Sb and Ab.

At step 1819, the browser 140 sends a request to the server 160 to authorize the user 110 to login to the first application. The browser 140 sends the credential information (e.g., username and password) along with the public key to the server 160. The information can be sent to the server 160 using a POST method. POST can be used to send data to the server to create and/or update information in the server. The data sent to the server with POST is stored in the request body of the HTTP request.

The server receives the username and password and checks that the information is correct. If it is correct, authentication succeeds, the server stores the public key in a database representing the session. The session information includes session information such as an expiration period (e.g., such as 12 hours or a day) for the session.

At step 1820, the IAM server creates a token SJWT with an identifier 'abc' and stores the token SJWT in a table with key as 'abc' and value as Sb. SJWT is sent back to browser to be stored in IndexedDb for future sessions At step 1821, the browser is going to store the token SJWT with an identifier 'abc.' The token SJWT is stored in a table with key as 'abc' and the value as Sb. SJWT is stored in IndexedDb for future sessions.

At step 1822, the browser makes a signed request to IAM to refresh end point. The request is signed by Sv and the authorization header has SJWT[id=abc].

At step 1823, the IAM server retrieves the id from the SJWT. In this example, the id=abc. The id represents the identifier. The server gets the public key from database for the key 'abc'. This is used to match the signature of the API call. If the signature is valid, then the IAM server creates AJWT with id='xyz' and stores it in the IAM database.

At step 1824, AJWT is returned back to browser. At step 1824, the server 160 sends AJWT[id=xyz] to the browser 140. At this point, AJWT is returned back to the browser, as the user is successfully logged into Application A.

At step 1825, user is the directed to application A with AJWT[id='xyz'] for making any signed calls and validation follows similar to how signature validation was done with refresh endpoint.

At step 1825, the browser is able to access the first application using the signed security token for the first application. The browser makes a call to application A using the signed JWT. The request is signed by the private key of application A. The browser sends the JWT corresponding to the application A private key that was signed by the server. Since JWT was signed by the private key of server (e.g., IAM server), this JWT can be validated by server. Therefore, the first application can ask the server if the JWT can be trusted or not In the example shown in FIGS. 18 and 19, a signed version of the ID is used. See for example, steps 1820, 1821 and 1822 of FIG. 18, and steps 1917, 1918, and 1919 of FIG. 19. That is, an SJWT is used. However, in other example embodiments, a signed version of the ID may not be used. That is, an SJWT may not be used. Instead, the ID (e.g., ID-abc) can be used directly. The server authenticates the user by making sure that the signature matches the public key stored in the server database (e.g., IAM database).

In the examples described, signatures can be used in place of a cookie, regardless of whether the signing key is persistent in the IAM database, or whether the signing key is kept by the client in an SJWT/certificate that it resents with each request.

Method of Logging into Second Application—Server Database

In a single sign-on situation, the user does not need to enter their credentials for every application they access. A user can log into a second application without having to enter their credentials.

Since the second application (Application B) and the first application (Application A) are in different domains, authorization to access the application needs to be performed for each application. That is, authorization is needed to access Application B and a separate authorization is needed to access Application A.

The public key that was being used for Application A cannot be used for Application B, because the private key that is needed for Application B is in the domain of Application B, and the initial token only contains a public key of Application A. The scripts that are making calls to Application B cannot access the private key that is stored in the domain of Application A, even though they are on the client side.

In the past, if a session with a second application is to be established, the user directly establishes a session with the second application. In an example embodiment, single-sign on is used to allow the user to access the second application, without requiring the user to perform a second authorization with the second application.

Since Application A and Application B are on different domains, different public keys will be needed to access each application. A public key for Application A's session and another public key for Application B's session. However, since an example embodiment allows for single sign-on, the second public key can be obtained without challenging the user again for credentials. The user does not need to re-enter their credential information.

In order to log into the second application, the browser 140 is going to use the second private key (Sv) that was generated in step 1817 of FIG. 18. The browser will sign materials associated with the request to access the second application 155. For example, the request may include a current timestamp or username. An asymmetric digital signature is created using the private key. The server private key is unextractable and was created along with the initial authentication request when accessing the first application. The browser uses the private key from storage located in the browser in order to sign requests. That is, the private key is non-extractable, but can be used by the API of the browser to sign a request.

If a session has already been established with the server, then the browser will use the server private key that it already has stored to authenticate the session with the second application. The browser can send a request along with the public key for the second application and the login application will sign the request authorizing access to the second application. The browser can send the signed information to the second application and the second application will authenticate the session and allow access to the second application.

Figure 19:
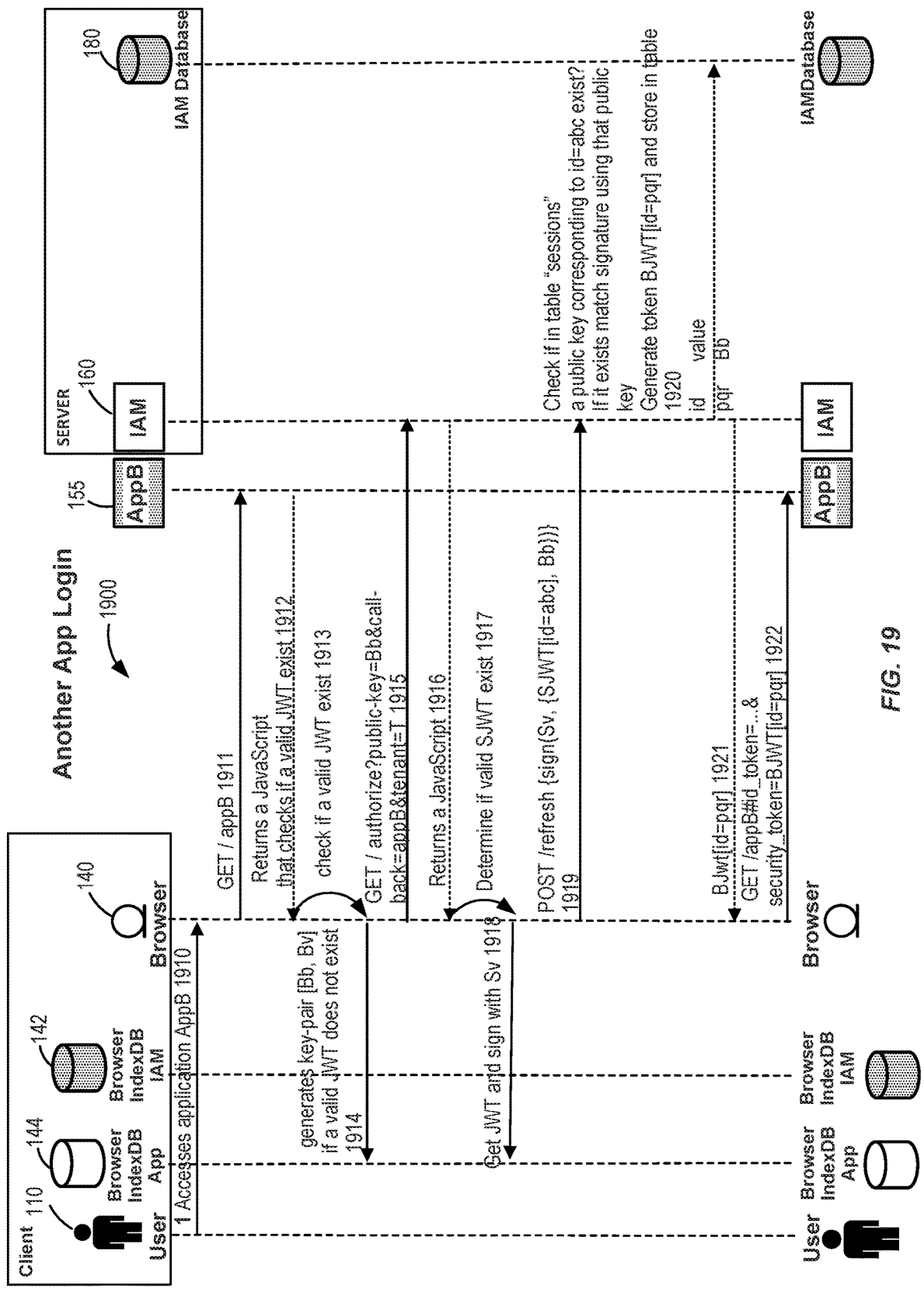
FIG. 19 illustrates a sequence diagram of a method for logging into a second application using a server database, in accordance with some example embodiments.

FIG. 19 illustrates a sequence diagram of a method 1900 for logging into a second application using a server database, in accordance with some example embodiments. In the example shown in FIG. 19, the public key is not a token and is maintained on a server.

FIG. 19 is similar to FIG. 4, however, FIG. 19 includes a server database 180 (e.g., IAM database). The server database can be configured to store public keys.

The steps shown in FIG. 19 occur after the steps in FIG. 18 are performed and a user has successfully logged into a first application (Application A). The example embodiment of logging a user onto a second application is performed after the user has already logged onto the first application.

At step 1910, the user 110 wants to access a second application 155 (e.g. App B). At this point in time the user has already logged into the first application (App A) and a private key for the first session was created and stored in storage for the browser 140. For example, the private key can be stored in the storage IndexedDB IAM 142. That is, the sequence shown in FIG. 18, has been performed prior to performing the sequence shown in FIG. 19, and the user is logged into the first application. The user would now like to access a second application (e.g., App B) that is different from the first application (e.g., App A).

At step 1911, the browser 140 sends a request to the second application 155. The request is to access second application 155. The request can be for example a GET request.

At step 1912, the second application (Application B) will send a JavaScript back to browser. The second application 155 can return a JavaScript that will be used to check if a valid JWT exists.

In an example embodiment, the JavaScript code can be used to authenticate. Therefore, instead of merely sending a cookie over as disclosed in the prior art, the key is used to sign timely data. For example, the timely data can include, for example, a timestamp and a name representing the user. The data is signed cryptographically such that the resulting signature can be validated using the public key as proof that only someone with the private key certified by the browser could have made that signature. The browser is going to take the signature and send it along with the request for data from the server. The signature can be in an HTTP header to ensure a secure transmission.

At step 1913, the JavaScript is used to check if a valid JWT exists. Application returns a JavaScript to browser that checks if a valid session exists. The session is validated by client application checking if a valid JWT exists. If a valid JWT does not exist, then the JavaScript generates a public-private key pair and stores it in browser IndexedDb.

The JavaScript code for the second application 155 will recognize if there is a key pair that has been generated, and if it is available in local storage. The JWTs will have a timestamp to show whether it is valid for a session. At step 1913, the browser 140 checks if a valid JWT exists using the JavaScript that the browser 140 received from the second application 155.

At step 1914, the browser is going to generate the third public-private key pair (Bb and By) if it was determined at step 1913 that a valid JWT for the second application (application B) does not exist. In the third key pair, Bb is the public key and By is the private key. The private key By is not sent to the second application 155 or to the server 160. Instead, the private key remains stored locally at the browser 140, such as in browser IndexedDB App B 144. The private key By is used to sign requests.

At step 1915, the public key Bb is sent to the server application. The browser 140 sends a request to authentication server 160 which includes the public key for authorizing access to the second application 155. The request can be a GET request. The request that is sent to the second application 155 includes the public key (Bb) that was generated by the browser at step 1914. JavaScript then redirects user's browser to IAM server with the public key [Bb] generated in steps 1912, 1913 and 1914.

At step 1916, the server application will send back another JavaScript to check if a valid JWT exists.

At step 1917, the JavaScript is used to determine whether there is a valid server token (SJWT). It is determined whether a valid authentication server JWT (SJWT) exists IAM server returns a JavaScript that checks if there is a SJWT existing.

At step 1918, if it is determined that there is a valid server token SJWT, then the browser can determine that they are in the domain of the login application. If a valid authentication server JWT exists, at step 1918 the JWT is obtained and signed with the second private key (Sv) that was generated in step 1817 of FIG. 18. If an SJWT exists, then it can be used to make a signed call to IAM to get BJWT.

At step 1919, since it was determined that there exists a valid SJWT, the browser sends a signed request to IAM using refresh end point. The request is signed by Sv and the authorization header has SJWT[id=abc].

At step 1920 the IAM server retrieves the id from SJWT, and gets the public key from the database for the key 'abc'.

This is used to match the signature of the API call. If signature is valid, then IAM creates BJWT with id='pqr' and stores Bb for key 'pqr' in IAM database.

At step 1921, BJWT is returned back to browser and user is directed to application B with BJWT[id='pqr'] for making any signed calls. Validation follows similar to how signature validation was done using refresh endpoint.

As disclosed in the example embodiments, the public key that is stored in the server database and is associated with the login session, and the digital signature, that includes the private key, is validated using the public key stored in the database. The server will check, for example, time stamp information of the signed material to make sure that the material was signed recently. Upon a successful validation of that digital signature, the call is authenticated.

In both example embodiments of logging into a first application and logging into a second application, the private key of the first key pair is stored only on the browser side.

Separate public keys are obtained for each application since the private key that is used for Application B is in the domain of Application B and the private key that is used for Application A is in the domain of Application A. The scripts that are making calls to application B cannot access the private key of application A. The scripts that are making calls to application A cannot access the private key of application B. Therefore, each application has their own public key in order to obtain the private token.

Computer Systems

Figure 13:
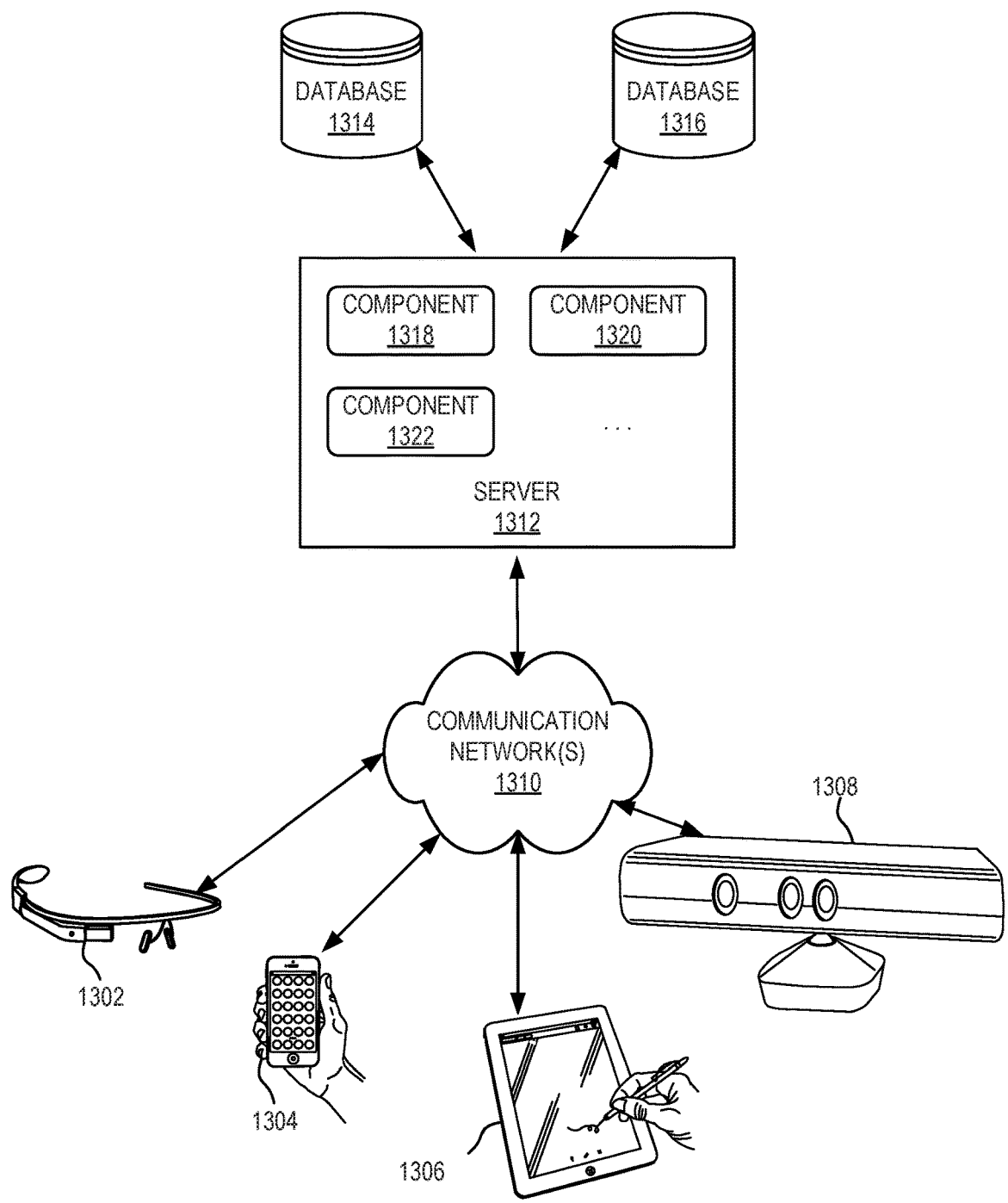
FIG. 13 illustrates a simplified diagram of a distributed system for implementing some embodiments.
Figure 14:
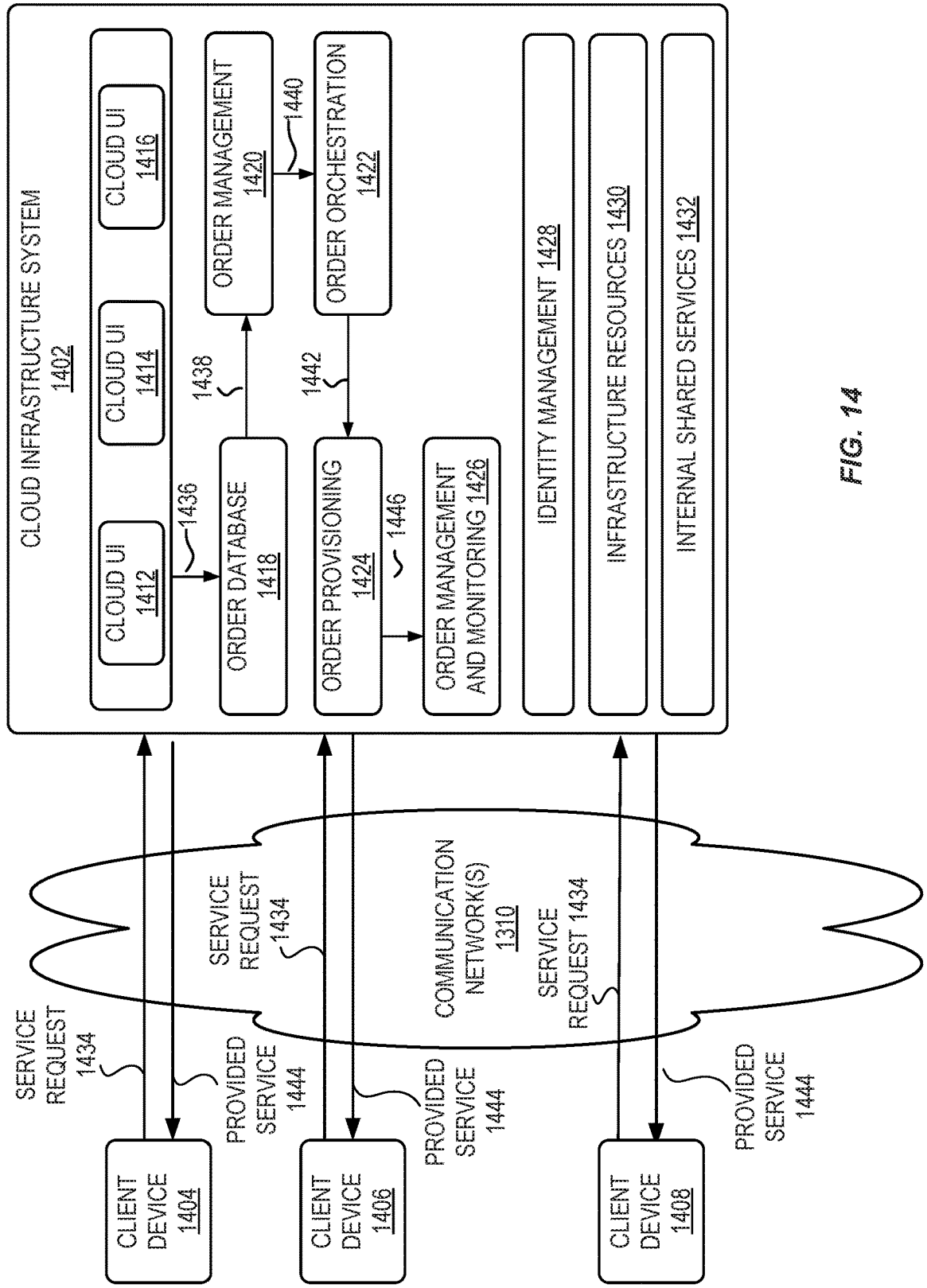
FIG. 14 is a simplified block diagram of one or more components of a system environment in which services may be offered as cloud services, in accordance with some embodiments.
Figure 15:
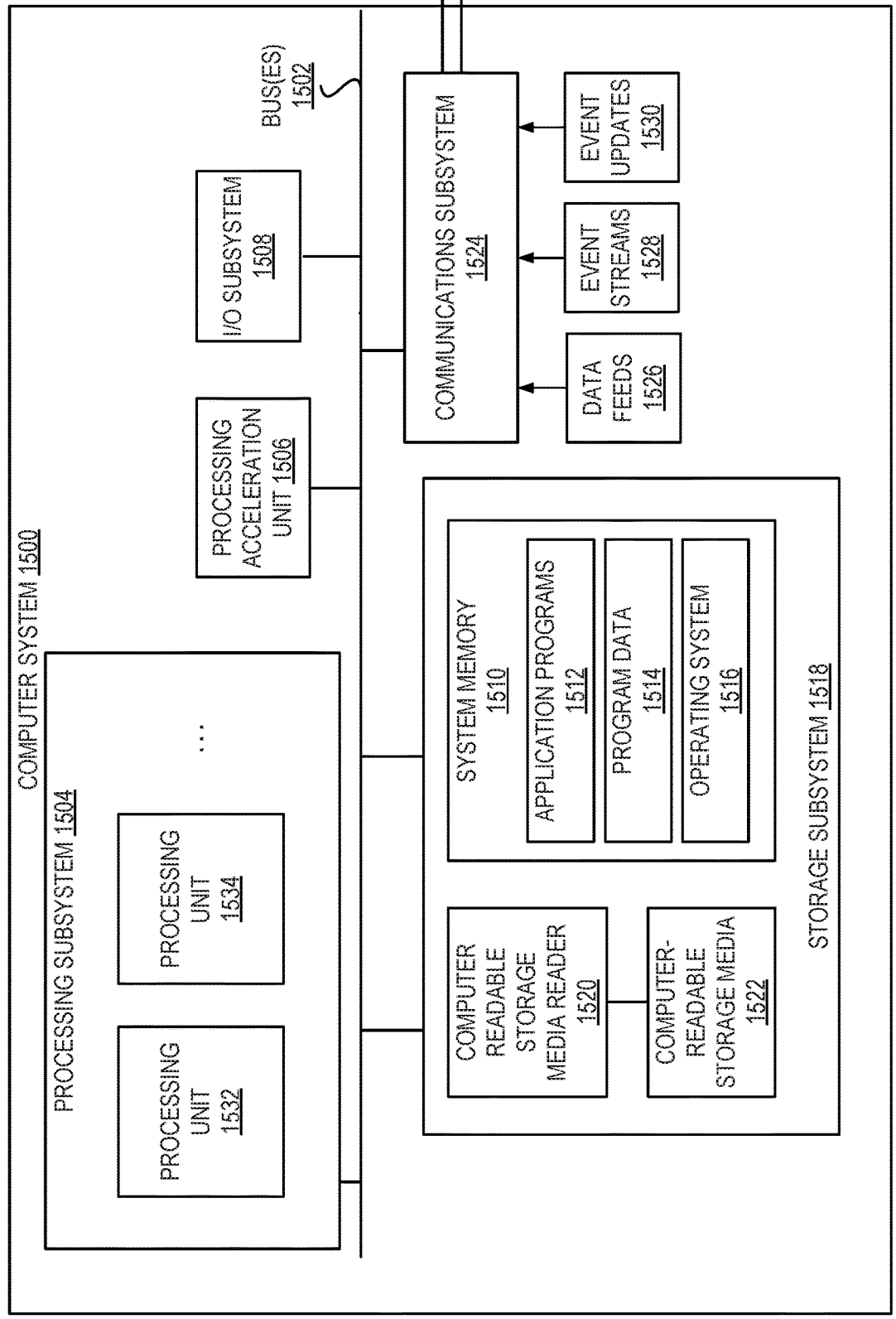
FIG. 15 illustrates an exemplary computer system that may be used to implement certain components according to some embodiments.

FIGS. 13, 14, and 15 illustrate exemplary hardware and/or software configurations used in various embodiments.

FIG. 13 illustrates a simplified diagram of a distributed system for implementing some example embodiments. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network 1310.

In various embodiments, server 1312 may be adapted to run one or more services or software applications such as services and applications that provide code and/or data for performing efficient application configuration patching for applications executing at the server 1312 or another server. In certain embodiments, server 1312 may also provide other services or software applications that can include non-virtual and virtual environments. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in FIG. 13, software components 1318, 1320 and 1322 of system 1300 are shown as being implemented on server 1312. As one example, one or more of the components (e.g., software component 1318) may be the configuration patch module or binary patch module discussed throughout the application.

In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in FIG. 13 is thus one example of a distributed system for implementing an embodiment system and is not intended to be limiting.

Client computing devices 1302, 1304, 1306, and/or 1308 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1310.

Although distributed system 1300 in FIG. 13 is shown with four client computing devices, any number of client computing devices may be supported. Other devices, such as devices with sensors, etc., may interact with server 1312.

Communication network(s) 1310 in distributed system 1300 may be any type of network that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1312 can include one or more virtual machines running virtual operating systems, or other computing architectures involving virtualization. One or more flexible pools of logical storage devices can be virtualized to maintain virtual storage devices for the server. Virtual networks can be controlled by server 1312 using software defined networking. In various embodiments, server 1312 may be adapted to run one or more services or software applications described in the foregoing disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1300 may also include one or more databases 1314 and 1316. These databases may provide a mechanism for storing information such as user interactions information, usage patterns information, adaptation rules information, and other information used by example embodiments. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands. However, databases 1314 and 1316 may provide relational databases, object-oriented databases, object-relational databases, NoSQL databases, etc., and may or may not be SQL-based. For example, databases 1314 and/or 1316 may be Oracle Database, PostgreSQL, Microsoft SQL Server, MySQL, MemSQL, Memcached, Redis, MongoDB, BigTable, Cassandra, DB2, Solr, etc.

In some embodiments, code and/or data for performing efficient application configuration patching may be offered as services via a cloud environment. FIG. 14 is a simplified block diagram of one or more components of a system environment 1400 in which services may be offered as cloud services, in accordance with some embodiments of the present disclosure. In the illustrated embodiment in FIG. 14, system environment 1400 includes one or more client computing devices 1404, 1406, and 1408 that may be used by users to interact with a cloud infrastructure system 1402 that provides cloud services. Additionally, in some embodiments the "client" computing devices 1404, 1406, 1408 may actually be server computers acting as a client in a client-server relationship, where the server may provide application configuration patching services. Cloud infrastructure system 1402 may comprise one or more computers and/or servers that may include those described above for server 1312.

It should be appreciated that cloud infrastructure system 1402 depicted in FIG. 14 may have other components than those depicted. Further, the embodiment shown in FIG. 14 is one example of a cloud infrastructure system that may incorporate an example embodiment. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308. Client computing devices 1404, 1406, and 1408 may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402. Although exemplary system environment 1400 is shown with three client computing devices, any number of client computing devices may be supported. Other devices such as devices with sensors, etc. may interact with cloud infrastructure system 1402.

Communication network(s) 1310 may facilitate communications and exchange of data between clients 1404, 1406, and 1408 and cloud infrastructure system 1402. Each network may be any type of network that can support data communications using any of a variety of commercially-available protocols, including those described above for communication network(s) 1310.

In certain embodiments, services provided by cloud infrastructure system 1402 may include a host of services that are made available to users of the cloud infrastructure system on demand. In addition to services related to providing code and/or data for performing efficient application configuration patching operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1402 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1402 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle Corporation) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1402 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1402 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform, and other resources.

In some embodiments, resources in cloud infrastructure system 1402 may be shared by multiple users and dynamically re-allocated per demand. Additionally, resources may be allocated to users in different time zones. For example, cloud infrastructure system 1402 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 to enable provisioning of services by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1402, and the like.

In one embodiment, as depicted in FIG. 14, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In an exemplary operation, at 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI) such as cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

At 1436, the order information received from the customer may be stored in an order database 1418. If this is a new order, a new record may be created for the order. In one embodiment, order database 1418 can be one of several databases operated by cloud infrastructure system 1418 and operated in conjunction with other system elements.

At 1438, the order information may be forwarded to an order management module 1420 that may be configured to perform billing and accounting functions related to the order, such as verifying the order, and upon verification, booking the order.

At 1440, information regarding the order may be communicated to an order orchestration module 1422 that is configured to orchestrate the provisioning of services and resources for the order placed by the customer. In some instances, order orchestration module 1422 may use the services of order provisioning module 1424 for the provisioning. In certain embodiments, order orchestration module 1422 enables the management of business processes associated with each order and applies business logic to determine whether an order should proceed to provisioning.

As shown in the embodiment depicted in FIG. 14, at 1442, upon receiving an order for a new subscription, order orchestration module 1422 sends a request to order provisioning module 1424 to allocate resources and configure resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. This enables order orchestration module 1422 to be isolated from implementation details, such as whether or not services and resources are actually provisioned on the fly or pre-provisioned and allocated/assigned upon request.

At 1444, once the services and resources are provisioned, a notification may be sent to the subscribing customers indicating that the requested service is now ready for use. In some instance, information (e.g. a link) may be sent to the customer that enables the customer to start using the requested services.

At 1446, a customer's subscription order may be managed and tracked by an order management and monitoring module 1426. In some instances, order management and monitoring module 1426 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1400 may include an identity management module 1428 that is configured to provide identity services, such as access management and authorization services in cloud infrastructure system 900. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

FIG. 15 illustrates an exemplary computer system 1500 that may be used to implement certain components according to some example embodiments. In some embodiments, computer system 1500 may be used to implement any of the various servers and computer systems described above. As shown in FIG. 15, computer system 1500 includes various subsystems including a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 may include tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1504 controls the operation of computer system 1500 and may comprise one or more processing units 1532, 1534, etc. A processing unit may include be one or more processors, including single core or multicore processors, one or more cores of processors, or combinations thereof. In some embodiments, processing subsystem 1504 can include one or more special purpose co-processors such as graphics processors (GPUs), digital signal processors (DSPs), or the like. In some embodiments, some or all of the processing units of processing subsystem 1504 can be implemented using customized circuits, such as application specific integrated circuits (ASICs), or field programmable gate arrays (FPGAs).

In some embodiments, the processing units in processing subsystem 1504 can execute instructions stored in system memory 1510 or on computer readable storage media 1522. In various embodiments, the processing units can execute a variety of programs or code instructions and can maintain multiple concurrently executing programs or processes. At any given time, some or all of the program code to be executed can be resident in system memory 1510 and/or on computer-readable storage media 1522 including potentially on one or more storage devices. Through suitable programming, processing subsystem 1504 can provide various functionalities described above for performing efficient application configuration patching operations.

In certain embodiments, a processing acceleration unit 1506 may be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term "input device" is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1518 provides a repository or data store for storing information that is used by computer system 1500. Storage subsystem 1518 provides a tangible non-transitory computer-readable storage medium for storing the basic programming and data constructs that provide the functionality of some embodiments. Software (programs, code modules, instructions) that when executed by processing subsystem 1504 provide the functionality described above may be stored in storage subsystem 1518. The software may be executed by one or more processing units of processing subsystem 1504. Storage subsystem 1518 may also provide a repository for storing data used in accordance with the example embodiments.

Storage subsystem 1518 may include one or more non-transitory memory devices, including volatile and non-volatile memory devices. As shown in FIG. 15, storage subsystem 1518 includes a system memory 1510 and a computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM) or dynamic random access memory (DRAM).

By way of example, and not limitation, as depicted in FIG. 15, system memory 1510 may store application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1522 may store programming and data constructs that provide the functionality of some embodiments. Software (programs, code modules, instructions) that when executed by processing subsystem 1504 a processor provide the functionality described above may be stored in storage subsystem 1518. By way of example, computer-readable storage media 1522 may include non-volatile memory such as a hard disk drive, a magnetic disk drive, an optical disk drive such as a CD ROM, DVD, a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1522 may provide storage of computer-readable instructions, data structures, program modules, and other data for computer system 1500.

In certain embodiments, storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for storing computer-readable information.

In certain embodiments, computer system 1500 may provide support for executing one or more virtual machines. Computer system 1500 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1500. Accordingly, multiple operating systems may potentially be run concurrently by computer system 1500. Each virtual machine generally runs independently of the other virtual machines.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices.

Communication subsystem 1524 may support both wired and/or wireless communication protocols. For example, in certain embodiments, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

Communication subsystem 1524 can receive and transmit data in various forms. For example, in some embodiments, communications subsystem 1524 may receive input communication in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1524 may be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1500 depicted in FIG. 15 is intended only as a specific example. Many other configurations having more or fewer components than the system depicted in FIG. 15 are possible. There can be other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although embodiments have been described using a particular series of transactions and steps, example embodiments are not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the example embodiments. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method comprising:
   receiving, by a computing device comprising a processor and a memory, a first request to log on to a first application;
   generating, by the computing device, a first public-private key pair comprising a first public key and a first private key, wherein the first public-private key pair is associated with the first application;
   storing, by the computing device, the first public-private key pair on a local data store for the computing device;
   sending, by the computing device, a second request to authorize the first public key, wherein the second request comprises the first public key;
   generating, by the computing device, a second public-private key pair comprising a second public key and a second private key, wherein the second public-private key pair is associated with a server computer;
   receiving, by the computing device, credential information;
   sending, by the computing device, an authentication request including the credential information, the first public key and the second public key, to the server computer;
   receiving, by the computing device from the server computer, a server token, wherein the server token is generated based on the second public key;
   storing, by the computing device, the received server token in a second local data store;
   sending, by the computing device, a third request to the server computer, wherein the third request includes the server token and the third request is signed using the second private key;
   after sending the third request, receiving, by the computing device from the server computer, a first application token; and
   after receiving the first application token, authenticating, by the computing device, the first request to log on to the first application.

2. The method according to claim 1, further comprising:
   receiving, by the computing device, a fourth request to log on to a second application;
   generating, by the computing device, a third public-private key pair comprising a third public key and a third private key, wherein the third public-private key pair is associated with the second application;
   storing, by the computing device, the third public-private key pair on the second local data store for the computing device;
   sending, by the computing device, a fifth request to authorize the third public key, wherein the fifth request comprises the third public key;
   receiving, by the computing device, a second JavaScript;
   determining, by the computing device, whether the second JavaScript comprises a valid server token;
   obtaining, by the computing device, the server token from the second local data store;
   sending, by the computing device, a sixth request to the server computer, wherein the sixth request includes the server token and the sixth request is signed using the second private key;
   receiving, by the computing device from the server computer, a second application token; and
   authenticating, by the computing device, the fourth request to log on to the second application.

3. The method according to claim 1, wherein the computing device comprises a web browser.

4. The method according to claim 1, wherein the credential information comprises a user name and password.

5. The method according to claim 1, wherein before generating the first public-private key pair:
   receiving, by the computing device, a first JavaScript from the server computer; and
   determining, by the computing device, whether a valid JSON web token (JWT) exists based on the first JavaScript.

6. The method according to claim 1, wherein the first public-private key pair is stored on a first local IndexedDB associated with the first application.

7. The method according to claim 1, where the server token is stored on a second local IndexedDB associated with the server computer.

8. A non-transitory computer-readable storage medium storing instructions which, when executed by one or more processors of a computing device, cause the one or more processors to perform a method comprising:
   receiving, by the computing device, a first request to log on to a first application;
   generating, by the computing device, a first public-private key pair comprising a first public key and a first private key, wherein the first public-private key pair is associated with the first application;
   storing, by the computing device, the first public-private key pair on a local data store for the computing device;
   sending, by the computing device, a second request to authorize the first public key, wherein the second request comprises the first public key;
   generating, by the computing device, a second public-private key pair comprising a second public key and a second private key, wherein the second public-private key pair is associated with a server computer;
   receiving, by the computing device, credential information;
   sending, by the computing device, an authentication request including the credential information, the first public key and the second public key, to the server computer;
   receiving, by the computing device from the server computer, a server token, wherein the server token is generated based on the second public key;
   storing, by the computing device, the received server token in a second local data store;

sending, by the computing device, a third request to the server computer, wherein the third request includes the server token and the third request is signed using the second private key;

after sending the third request, receiving, by the computing device from the server computer, a first application token; and after receiving the first application token, authenticating, by the computing device, the first request to log on to the first application.

9. The non-transitory computer-readable storage medium according to claim 8, comprising instructions that cause the one or more processors to perform the method further comprising:

receiving, by the computing device, a fourth request to log on to a second application;

generating, by the computing device, a third public-private key pair comprising a third public key and a third private key, wherein the third public-private key pair is associated with the second application;

storing, by the computing device, the third public-private key pair on the second local data store for the computing device;

sending, by the computing device, a fifth request to authorize the third public key, wherein the fifth request comprises the third public key;

receiving, by the computing device, a second JavaScript;

determining, by the computing device, whether the second JavaScript comprises a valid server token;

obtaining, by the computing device, the server token from the second local data store;

sending, by the computing device, a sixth request to the server computer, wherein the sixth request includes the server token and the sixth request is signed using the second private key;

receiving, by the computing device from the server computer, a second application token; and authenticating, by the computing device, the fourth request to log on to the second application.

10. The non-transitory computer-readable storage medium according to claim 8, wherein the computing device comprises a web browser.

11. The non-transitory computer-readable storage medium according to claim 8, wherein the credential information comprises a user name and password.

12. The non-transitory computer-readable storage medium according to claim 8, wherein before generating the first public-private key pair:

receiving, by the computing device, a first JavaScript from the server computer; and determining, by the computing device, whether a valid JSON web token (JWT) exists based on the first JavaScript.

13. The non-transitory computer-readable storage medium according to claim 8, wherein the first public-private key pair is stored on a first local IndexedDB associated with the first application.

14. A computing device, comprising:
a memory; and
one or more processors configured to:
receive a first request to log on to a first application;

generate a first public-private key pair comprising a first public key and a first private key, wherein the first public-private key pair is associated with the first application;

store the first public-private key pair on a local data store for the computing device;

send a second request to authorize the first public key, wherein the second request comprises the first public key;

generate a second public-private key pair comprising a second public key and a second private key, wherein the second public-private key pair is associated with a server computer;

receive credential information;

send an authentication request including the credential information, the first public key and the second public key, to the server computer;

receive a server token, wherein the server token is generated based on the second public key;

store the received server token in a second local data store;

send a third request to the server computer, wherein the third request includes the server token and the third request is signed using the second private key;

after sending the third request, receive from the server computer, a first application token; and after receiving the first application token, authenticate the first request to log on to the first application.

15. The computing device according to claim 14, further comprising one or more processors configured to:

receive a fourth request to log on to a second application;

generate a third public-private key pair comprising a third public key and a third private key, wherein the third public-private key pair is associated with the second application;

store the third public-private key pair on the second local data store for the computing device;

send a fifth request to authorize the third public key, wherein the fifth request comprises the third public key;

receive a second JavaScript determine whether the second JavaScript comprises a valid server token;

obtain the server token from the second local data store;

send a sixth request to the server computer, wherein the sixth request includes the server token and the sixth request is signed using the second private key;

receive from the server computer, a second application token; and authenticate the fourth request to log on to the second application.

16. The computing device according to claim 14, wherein the second request is signed using a digital signature.

17. The computing device according to claim 14, wherein the computing device is comprises a web browser storing the second private key that is unextractable.

18. The computing device according to claim 14, a WebCrypto library facilitates storage of the second private key that is unextractable.

19. The computing device according to claim 14, wherein the computing device is a client side computing device.

* * * * *

UNITED STATES PATENT AND TRADEMARK OFFICE
CERTIFICATE OF CORRECTION

PATENT NO. : 11,121,863 B1
APPLICATION NO. : 17/069561
DATED : September 14, 2021
INVENTOR(S) : O'Neill et al.

It is certified that error appears in the above-identified patent and that said Letters Patent is hereby corrected as shown below:

On the Title Page

On page 2, Column 1, under Other Publications, Line 13, delete "supportsap.com/" and insert -- support.sap.com/ --, therefor.

In the Specification

In Column 4, Line 38, delete "SJWT(Sb)})." and insert -- SJWT(Sb)}}). --, therefor.

In Column 9, Line 4, after "IndexedDB" insert -- . --.

In Column 11, Line 47, after "not" insert -- . --.

In Column 12, Line 6, after "database" insert -- . --.

In Column 13, Line 12, after "information" insert -- . --.

In Column 16, Line 29, after "environment" insert -- . --.

In Column 20, Line 2, after "sessions" insert -- . --.

In Column 20, Line 33, after "not" insert -- . --.

In Column 20, Line 40, delete "ID-abc)" and insert -- ID=abc) --, therefor.

In Column 24, Line 45, delete "Internet" and insert -- Internetwork --, therefor.

In Column 33, Line 63, delete "(e.g.," and insert -- e.g., --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*

In the Claims

In Column 38, Line 54, in Claim 17, after "device" delete "is".